(12) United States Patent
Anand et al.

(10) Patent No.: US 12,712,908 B2
(45) Date of Patent: Aug. 18, 2026

(54) COMPUTER-IMPLEMENTED METHOD AND SYSTEM FOR ASSESSING THE RISK STATUS OF ONE OR MORE NETWORKED DEVICES USING BEST PRACTICES GUIDELINES

(71) Applicant: NEWSOUTH INNOVATIONS PTY LIMITED, Sydney (AU)

(72) Inventors: Jay Kartik Anand, Sydney (AU); Arunan Sivanathan, Sydney (AU); Mohammed Ayyoob Ahamed Hamza, Sydney (AU); Ziwei Long, Sydney (AU); Hassan Habibi Gharakheili, Sydney (AU)

(73) Assignee: NEWSOUTH INNOVATIONS PTY LIMITED, Sydney (AU)

( * ) Notice: Subject to any disclaimer, the term of this patent is extended or adjusted under 35 U.S.C. 154(b) by 71 days.

(21) Appl. No.: 18/699,026

(22) PCT Filed: Oct. 7, 2022

(86) PCT No.: PCT/AU2022/051204
§ 371 (c)(1),
(2) Date: Apr. 5, 2024

(87) PCT Pub. No.: WO2023/056523
PCT Pub. Date: Apr. 13, 2023

(65) Prior Publication Data

US 2025/0233882 A1 Jul. 17, 2025

Related U.S. Application Data

(60) Provisional application No. 63/253,132, filed on Oct. 7, 2021.

(51) Int. Cl.
*H04L 9/40* (2022.01)

(52) U.S. Cl.
CPC ...... *H04L 63/1433* (2013.01); *H04L 63/1408* (2013.01)

(58) Field of Classification Search
CPC ............. H04L 63/1433; H04L 63/1408; H04L 9/3247; H04L 63/1425; H04L 43/20;
(Continued)

(56) References Cited

U.S. PATENT DOCUMENTS

2016/0267408 A1 9/2016 Singh et al.
2018/0144139 A1 5/2018 Cheng et al.
(Continued)

OTHER PUBLICATIONS

"International Search Report and Written Opinion of the International Searching Authority", International Application No. PCT/AU2022/051204, Jan. 20, 2023, 11 pp.

*Primary Examiner* — Amir Mehrmanesh
*Assistant Examiner* — Thomas A Gyorfi
(74) *Attorney, Agent, or Firm* — Myers Bigel, P.A.

(57) ABSTRACT

Embodiments of the present disclosure may include a computer-implemented method for assessing the risk status of one or more networked devices, including receiving a series of packets from one or more selected networked devices, the series of packets associated with at least one communication protocol. Embodiments may also include identifying the at least one communication protocol associated with the series of packets by matching one or more signatures of the series of packets with at least one reference data model. Embodiments may also include using the at least one identified communication protocol to extract at least one attribute value from the series of packets. Embodiments may also include determining a risk of the at least one attribute value of the networked device by comparing the extracted attribute value to a reference value guideline, the reference value guideline based at least in part on the identified communication protocol.

20 Claims, 14 Drawing Sheets

(58) Field of Classification Search
CPC ......... H04L 43/18; H04L 63/20; H04L 63/08; H04L 63/16; H04L 63/1416; G06F 21/44; G06F 21/606; G06F 21/577; G06F 21/82; G06N 5/01; G06N 20/00; G16Y 10/80; G16Y 30/10; G16Y 40/50
See application file for complete search history.

(56) References Cited

U.S. PATENT DOCUMENTS

| | | | | |
|---|---|---|---|---|
| 2018/0307849 | A1* | 10/2018 | Tseitlin | G06F 11/302 |
| 2020/0267146 | A1* | 8/2020 | Nambiar | G06N 20/00 |
| 2020/0336508 | A1* | 10/2020 | Srivastava | H04L 63/20 |
| 2021/0037043 | A1 | 2/2021 | Lee et al. | |
| 2021/0136100 | A1* | 5/2021 | Gupta | H04L 63/1433 |
| 2021/0306354 | A1 | 9/2021 | Raghuramu et al. | |
| 2022/0060498 | A1* | 2/2022 | Head, Jr. | H04L 12/4641 |
| 2022/0321532 | A1* | 10/2022 | Du | H04L 43/062 |

* cited by examiner

```
GET /axis-cgi/motion/motiondata.cgi HTTP/1.0
Authorization: Basic dXNlcjpzb2llcGFz[illegible]Q=
Connection: close
Host: 192.168.1.1:80
```

FIG. 6A

```
GET /axis-cgi/param.cgi?action-list&group... HTTP/1.1
Connection: Keep-Alive
User-Agent: OmnicastHttpClientAsync-SEC-ARC01A/1.0
Host: 192.168.1.2
[truncated]Authorization: Digest
    username= "admin"
    realm= "AXIS_B8A44F13D037"
    nonce= "LIC9FFNABgA=c5e743fj49n320vn2nnbdf3..."
    uri= "/axis-cgi/param.cgi?action-list&group..."
    cnonce= "63bd02fce6a08c4236be93ngajgue33942..."
    nc= "00000001"
    algorithm= MD5
    response= "ee72034b6d15f700011d43ec      96"
```

FIG. 6B

COMPUTER-IMPLEMENTED METHOD AND SYSTEM FOR ASSESSING THE RISK STATUS OF ONE OR MORE NETWORKED DEVICES USING BEST PRACTICES GUIDELINES

CROSS-REFERENCE TO RELATED APPLICATIONS

This application is a 35 U.S.C. § 371 national stage application of PCT Application No. PCT/AU2022/051204, filed Oct. 7, 2022, which itself claims priority to U.S. Provisional Patent Application No. 63/253,132, filed Oct. 7, 2021, titled "PASSIVE VERIFICATION OF DEFAULT CREDENTIALS IN NETWORK TRAFFIC OF CONNECTED CAMERAS", both of which are hereby incorporated by reference in their entireties.

FIELD

This description relates to using data models in network cybersecurity.

BACKGROUND

Enterprise networks are increasingly becoming large and complex, and hence challenging to manage, as more Internet-of-Things (IoT) assets, like cameras, building management sensors, or printers, come online with diverse system and communication capabilities. Heterogeneous connected assets demand a systematic approach for identifying their types, assessing their risks and vulnerabilities, or detecting cyber incidents since individual and manual attentions are no longer practical.

Stories about compromised networked devices such as IP-based cameras have increasingly appeared in the news over the past several years. For example, there were widespread reports of a large-scale distributed denial-of-service (DDoS) attack in 2016, sourced by the Mirai botnet, which shut down parts of the Internet infrastructure. The DDoS attack was particularly successful since the users of the compromised cameras (and some other victim IoT devices) relied on default usernames and passwords, which was the entry point for the compromised cameras. Default and publicly listed passwords remain an attractive target to both unskilled and experienced cybercriminals. Attackers' incentives vary from obtaining customer credit card information and selling video footages of private settings to exploiting these devices as part of larger attacks and as part of cryptocurrency mining operations.

Further, enterprises tend to increasingly invest in cyber physical solutions that often place an emphasis on widely deploying networked devices such as IP-based cameras to create a safer environment for their staff and customers. Manufacturers often ship networked connected devices with known vulnerabilities like an obsolete version of software or communication protocol, weak/no encryption, or a default username and password so that the users and administrators can gain initial access to configure them. These vulnerabilities remain unpatched despite industry-standard guidance that advocates fixing them. For example, default passwords often remain unchanged out of convenience or forgetfulness. Even with the change of default passwords, networked devices still pose significant cyber risks given that many communicate with their associated controllers or servers via vulnerable services and protocols.

Commercial tools exist to catalog and identify some of the cyber risks of networked assets such as enterprise servers. Most of these tools actively query the assets and while useful in some contexts, this active query approach can be counterproductive to IoT assets such as building management sensors, printers, or IP-based security cameras for several reasons. First, unlike in a traditional server environment, incompatible queries sent to many IoT assets can reduce or completely remove device functionality given that most were not designed to be interactive network devices. Second, repeated querying can also generate a large amount of network traffic that common IoT assets are not designed to handle. Lastly, many IoT assets do not operate continuously due to organizational compliance requirements, and hence some devices in a dormant state during a periodic asset query may be missed. Therefore, there is a need for a solution that can unobtrusively analyze network traffic of IoT devices, and then identify and remedy when a cyber vulnerability is found in network communications of these devices.

BRIEF SUMMARY

Embodiments of the present disclosure may include a computer-implemented method for assessing the risk status of one or more networked devices, including receiving a series of packets from one or more selected networked devices, the series of packets associated with at least one communication protocol. Embodiments may also include identifying the at least one communication protocol associated with the series of packets by matching one or more signatures of the series of packets with at least one reference data model.

Embodiments may also include using the reference data model of the at least one identified communication protocol to extract at least one attribute value from the series of packets. Embodiments may also include determining a risk of the at least one attribute value of the networked device by comparing the extracted attribute value to a reference value guideline, the reference value guideline based at least in part on the identified communication protocol.

In some embodiments, the one or more networked devices may be one of a security camera, a thermostat, an occupancy sensor, an HVAC system, a lighting system, an access controller, a fire alarm, a physical security system, a camera, a networked appliance, an industrial device, or a robotic device. In some embodiments, the computer-implemented method may include receiving a network device selection command. In some embodiments, the network device selection command may be received by at least one of an API call and a security configuration.

Embodiments may also include receiving a network device selection command may be selected from a list of one or more networked devices. In some embodiments, the selection of the networked devices may be based on at least one of a configuration file, an IP address, a MAC address, and a VLAN tag. In some embodiments, the at least one reference data model may be a JSON-formatted data model.

In some embodiments, the at least one communication protocol may be an application layer protocol, a Secure Socket Layer protocol, a network layer protocol, and a datalink layer. In some embodiments, the at least one communication protocol may be an HTTP protocol, a DHCP protocol, a FTP protocol, a TLS protocol, an XMPP protocol, a TFTP protocol, POP3 protocol, IMAP protocol, an IPP protocol, a LPD protocol, an NTP protocol, RTP protocol, RTMP protocol, a SIP protocol, an SSDP protocol, an SMB protocol, an SNMP protocol, an SMTP protocol, a DNP3 protocol, a DNS protocol, an MDNS protocol, an NBNS protocol, a BACnet protocol, and an NTP protocol.

In some embodiments, the at least one communication protocol may be a client-server protocol, a TCP/IP protocol, a UDP protocol, an automation protocol, a Bluetooth protocol, a file transfer protocol, an instant messaging protocol, and an internet protocol, an OSI protocol, a routing protocol, a web service protocol, a Web 3.0 protocol, and a blockchain protocol. In some embodiments, the computer-implemented method may include implementing a selective inspection of one or more packets from within the series of packets may be facilitated using a network switch.

In some embodiments, the network switch may be a programmable switch. In some embodiments, the programmable switch may include instructions that when implemented cause the programmable switch to mirror a selection of packets from the series of packets for passive analysis. In some embodiments, the series of packets from the selected networked device may be sent to a protocol analyzer that performs selective inspection of one or more packets.

In some embodiments, the computer-implemented method may include a reference data model. In some embodiments, the reference data model may include at least one of an attribute value, an info value, a metadata value, and a content value associated with the at least one communication protocol. Embodiments may also include an attribute value may be at least one of a name, a parser type, a parser pattern, a data type, and a direction.

Embodiments may also include a meta data value may be at least one of an ether type, an IP protocol, a server port, a client port, a traffic mode, a network scope, a relationship, and a content class. Embodiments may also include an info value may be at least one of a namespace, version, latest update date, abbreviation, name, description, protocol, protocol URL, and an inheritance.

In some embodiments, the protocol URL specifies a web address containing a communication protocol schema. Embodiments may also include a content value may be at least one of a matcher, an eval, a matcher type, a matcher pattern, and a select. In some embodiments, the at least one attribute value may be at least one of a protocol version, an authentication method, a credential, a user agent, and a negotiated cipher.

In some embodiments, the extraction of authentication credentials may include using signature matching. Embodiments may also include extracting the authentication value may include extracting authentication credentials from the series of packets. Embodiments may also include using the at least one identified communication protocol to extract at least one attribute value from the series of packets may include associating a cybersecurity value with the at least one attribute value.

Embodiments may also include associating a cybersecurity value with the at least one attribute value may include comparing the extracted attribute value with the reference value guideline, the reference value guideline further including an expected value from at least one of basic authentication, digest authentication, New Technology LAN Manager (NTLM), and token-based SOAP authentication.

In some embodiments, the token-based SOAP authentication conforms to Open Network Video Interface Forum (ONVIF) specifications. In some embodiments, the extraction of authentication credentials may include using signature matching. In some embodiments, the at least one attribute value from the series of packets may include authentication metadata. In some embodiments, the risk of the at least one attribute value of the networked device may be an authentication vulnerability.

In some embodiments, the authentication metadata contains at least one of a hashed password, nonce, authentication credentials, authentication scheme, message response code, SOAP XML file, or the request's timestamp. In some embodiments, the computer-implemented method may include comparing the authentication metadata against a known list of vulnerable authentication credentials contained within the reference guideline.

In some embodiments, the computer-implemented method may include comparing the authentication metadata against a known authentication response. In some embodiments, the computer-implemented method may include storing the authentication metadata on a networked device. In some embodiments, the computer-implemented method may include signalling a network device to deauthorize the networked device associated with an accepted authentication response. In some embodiments, the authentication response contains vulnerable authentication credentials based on the risk. In some embodiments, the computer-implemented method further includes identifying a vulnerable authentication credential based at least in part on the attribute value from the reference data model. In some embodiments, the computer-implemented method may include providing a visual representation of the extracted metadata analysis.

Embodiments of the present disclosure may also include a computer-implemented method for assessing the authentication vulnerability status of one or more networked devices, including receiving a message from a selected networked device using a client-server protocol. Embodiments may also include determining that the message may be an authentication response based upon the received message. Embodiments may also include determining whether the authentication response may be accepted by one or more network controllers. Embodiments may also include determining whether the accepted authentication response of the selected device may be correlated with a known authentication request.

In some embodiments, the one or more networked devices may be one of a security camera, a thermostat, an occupancy sensor, an HVAC system, a lighting system, an access controller, a fire alarm, a physical security system, a camera, a networked appliance, an industrial device, or a robotic device. In some embodiments, the selected networked devices may be selected by a human operator.

Embodiments may also include machine learning may be used by a human operator to assist in the selection of the networked devices. In some embodiments, the selected networked devices may be chosen utilizing one or more of a configuration file, specifying IP addresses, specifying MAC addresses, specifying VLAN tags. In some embodiments, the client-server protocol may be undecrypted.

In some embodiments, the selective inspection of one or more packets may be facilitated using a programmable switch. In some embodiments, the programmable switch mirrors selected client-server packets from the selected networked device to enable passive analysis. Embodiments may also include selective inspection of one or more packets may be used on the received message to determine in part or entirety one or more of the following that the message may be an authentication response, the acceptance of the authentication response by one or more network controllers, and whether the accepted authentication response of the selected device may be correlated with a known authentication request.

In some embodiments, the programmable switch may be a Software Defined Network switch. In some embodiments, the message from a selected network device may be sent to a network controller that performs selective inspection of one or more packets. Embodiments may also include determining whether the accepted authentication response may be correlated with a known authentication request may include determining whether the known authentication request includes a vulnerable authentication credential.

Embodiments may also include determining whether the known authentication credentials contain vulnerable authentication credentials may include comparing the metadata against a known list of vulnerable authentication credentials. In some embodiments, the computer-implemented method may include signaling a network controller that it has accepted an authentication response that includes vulnerable authentication credentials.

In some embodiments, the computer-implemented method may include signaling a network device to deauthorize the networked device associated with the accepted authentication response containing vulnerable authentication credentials. In some embodiments, the computer-implemented method may include replacing an identified vulnerable authentication credential with a credential approved by a network controller. In some embodiments, the computer-implemented method may include storing the analyzed authentication metadata and related analysis results on a networked device. In some embodiments, the computer-implemented method may include providing a visual representation of the extracted metadata analysis.

Embodiments of the present disclosure may also include a system for assessing the risk status of one or more networked devices, the system including circuitry for receiving a series of packets from one or more selected networked devices, the series of packets associated with at least one communication protocol. Embodiments may also include circuitry for identifying the at least one communication protocol associated with the series of packets by matching one or more signatures of the series of packets with at least one reference data model.

Embodiments may also include circuitry for using the reference data model of the at least one identified communication protocol to extract at least one attribute value from the series of packets. Embodiments may also include circuitry for determining a risk of the at least one attribute value of the networked device by comparing the extracted attribute value to a reference value guideline, the reference value guideline based at least in part on the identified communication protocol.

In some embodiments, the one or more networked devices may be one of a security camera, a thermostat, an occupancy sensor, an HVAC system, a lighting system, an access controller, a fire alarm, a physical security system, a camera, a networked appliance, an industrial device, or a robotic device. In some embodiments, the system may include receiving a network device selection command. In some embodiments, the network device selection command may be received by at least one of an API call and a security configuration.

Embodiments may also include receiving a network device selection command may be selected from a list of one or more networked devices. In some embodiments, the selection of the networked devices may be based on at least one of a configuration file, an IP address, a MAC address, and a VLAN tag. In some embodiments, the at least one reference data model may be a JSON-formatted data model.

In some embodiments, the at least one communication protocol may be an application layer protocol, an SSL protocol, a network layer protocol, and a datalink layer. In some embodiments, the at least one communication protocol may be an HTTP protocol, a DHCP protocol, a FTP protocol, a TLS protocol, an XMPP protocol, a TFTP protocol, POP3 protocol, IMAP protocol, an IPP protocol, a LPD protocol, an NTP protocol, RTP protocol, RTMP protocol, a SIP protocol, an SSDP protocol, an SMB protocol, an SNMP protocol, an SMTP protocol, a DNP3 protocol, a DNS protocol, an MDNS protocol, an NBNS protocol, a BACnet protocol, and an NTP protocol.

In some embodiments, the at least one communication protocol may be a client-server protocol, a TCP/IP protocol, a UDP protocol, an automation protocol, a Bluetooth protocol, a file transfer protocol, an instant messaging protocol, and an internet protocol, an OSI protocol, a routing protocol, a web service protocol, a Web 3.0 protocol, and a blockchain protocol. In some embodiments, the system may include implementing a selective inspection of one or more packets from within the series of packets may be facilitated using a network switch.

In some embodiments, the network switch may be a programmable switch. In some embodiments, the programmable switch may include instructions that when implemented cause the programmable switch to mirror a selection of packets from the series of packets for passive analysis. In some embodiments, the series of packets from the selected networked device may be sent to a protocol analyzer that performs selective inspection of one or more packets.

In some embodiments, the system may include a reference data model. In some embodiments, the reference data model may include at least one of an attribute value, an info value, a metadata value, and a content value associated with the at least one communication protocol. Embodiments may also include an attribute value may be at least one of a name, a parser type, a parser pattern, a data type, and a direction.

Embodiments may also include a meta data value may be at least one of an ether type, an IP protocol, a server port, a client port, a traffic mode, a network scope, a relationship, and a content class. Embodiments may also include an info value may be at least one of a namespace, version, latest update date, abbreviation, name, description, protocol, protocol URL, and an inheritance.

In some embodiments, the protocol URL specifies a web address containing a communication protocol schema. Embodiments may also include a content value may be at least one of a matcher, an eval, a matcher type, a matcher pattern, and a select. In some embodiments, the at least one attribute value may be at least one of a protocol version, an authentication method, a credential, a user agent, and a negotiated cipher.

In some embodiments, the extraction of authentication credentials may include using signature matching. Embodiments may also include extracting the authentication value may include extracting authentication credentials from the series of packets. Embodiments may also include using the at least one identified communication protocol to extract at least one attribute value from the series of packets may include associating a cybersecurity value with the at least one attribute value.

Embodiments may also include associating a cybersecurity value with the at least one attribute value may include comparing the extracted attribute value with the reference value guideline, the reference value guideline further including an expected value from at least one of basic authentication, digest authentication, New Technology LAN Manager (NTLM), and token-based SOAP authentication.

In some embodiments, the token-based SOAP authentication conforms to Open Network Video Interface Forum (ONVIF) specifications. In some embodiments, the at least one attribute value from the series of packets may include authentication metadata. In some embodiments, the risk of the at least one attribute value of the networked device may be an authentication vulnerability.

In some embodiments, the authentication metadata contains at least one of a hashed password, nonce, authentication credentials, authentication scheme, message response code, SOAP XML file, or the request's timestamp. In some embodiments, the system may include comparing the authentication metadata against a known list of vulnerable authentication credentials contained within the reference guideline.

In some embodiments, the system may include comparing the authentication metadata against a known authentication response. In some embodiments, the system may include storing the authentication metadata on a networked device. In some embodiments, the system may include signalling a network device to deauthorize the networked device associated with an accepted authentication response. In some embodiments, the authentication response contains vulnerable authentication credentials based on the risk.

In some embodiments, the system may include identifying a vulnerable authentication credential based at least in part on the attribute value from the reference data model. In some embodiments, the computer-implemented method may include providing a visual representation of the extracted metadata analysis.

One aspect of the present patent application provides computer-implemented methods and systems for assessing the authentication vulnerability status of one or more networked devices, comprising: receiving a flow from a selected networked device using a client-server protocol; determining that the message is an authentication request based upon the received message; determining the authentication method based upon the authentication request; extracting the authentication metadata from the message based at least in part upon the determined authentication method wherein the authentication metadata includes at least one authentication credential; and determining a vulnerability of the authentication credential of the networked device based at least in part upon the extracted authentication metadata.

In some embodiments, the one or more networked devices is one of a security camera, a thermostat, an occupancy sensor, an HVAC system, a lighting system, an access controller, a fire alarm, a physical security system, a camera, a networked appliance, an industrial device, or a robotic device.

In some embodiments, the selected networked devices are selected by a human operator. In some embodiments, machine learning is used by a human operator to assist in the selection of the networked devices. In some embodiments, the selected networked devices are selected utilizing at least one of a configuration file, an IP address, a MAC address, and a Virtual LAN (VLAN) tag. In some embodiments, the client-server protocol is undecrypted.

In some embodiments, receiving a message from a selected networked device using a client-server protocol may also include selective inspection of one or more packets. In some embodiments, the inspection classifies the message as an authentication request and determines the authentication credentials of the message. In some embodiments, the selective inspection of one or more packets is facilitated using a programmable switch.

In some embodiments, the programmable switch is a Software Defined Network (SDN) switch. In some embodiments, the programmable switch mirrors selected client-server packets from the selected networked device to enable passive analysis. In some embodiments, the message from a selected network device is sent to a network controller that performs the selective inspection of one or more packets. In some embodiments, the step of determining the authentication method includes at least one of the following authentication methods, basic authentication, digest authentication, New Technology LAN Manager (NTLM), and token-based SOAP authentication.

In some embodiments, the token-based SOAP authentication conforms to Open Network Video Interface Forum (ONVIF) specifications. In some embodiments, extracting the authentication metadata includes extracting authentication credentials from the header of the message. In some embodiments, extracting the authentication metadata includes extracting authentication credentials from the payload of the message.

In some embodiments, the extraction of authentication credentials includes using signature matching. In some embodiments, aspects of the invention may also include where the authentication metadata contains at least one of a hashed password, nonce, authentication credentials, authentication scheme, message response code, SOAP XML file, or the request's timestamp.

In some embodiments, the step of analyzing the extracted authentication metadata includes comparing the metadata against a known list of vulnerable authentication credentials. In some embodiments, the step of analyzing the extracted authentication metadata includes comparing the metadata against a known authentication response. In some embodiments, aspects of the invention may also include that includes the step of storing the analyzed authentication metadata and related analysis results on a networked device.

In some embodiments, aspects of the invention may also include the step of signaling a network device to deauthorize the networked device associated with the accepted authentication response containing vulnerable authentication credentials. In some embodiments, aspects of the invention may also include replacing an identified vulnerable authentication credential with an authentication credential approved by the network controller. In some embodiments, aspects of the invention may also include providing a visual representation of the extracted metadata analysis.

Embodiments of the present disclosure may also include a computer-implemented method for assessing the authentication vulnerability status of one or more networked devices, including receiving a message from a selected networked device using a client-server protocol. In some embodiments, aspects of the invention may also include determining that the message is an authentication response based upon the received message. In some embodiments, aspects of the invention may also include determining whether the authentication response is accepted by the network controller. In some embodiments, aspects of the invention may also include determining whether the accepted authentication response of the selected device is correlated with a known authentication request.

In some embodiments, the one or more networked devices is one of a security camera, a thermostat, an occupancy sensor, an HVAC system, a lighting system, an access controller, a fire alarm, a physical security system, a camera, a networked appliance, an industrial device, or a robotic device. In some embodiments, the selected networked devices are selected by a human operator. In some embodiments, machine learning is used by a human operator to assist in the selection of the networked devices.

In some embodiments, the selected networked devices are chosen to utilize one or more of a configuration file, an IP address, a MAC address, a VLAN tags. In some embodiments, the client-server protocol is undecrypted. In some embodiments, the selective inspection of one or more packets is used on the received message to determine in part or entirety one or more of the following, that the message is an authentication response, the acceptance of the authentication response by the network controller, and whether the accepted authentication response of the selected device is correlated with a known authentication request.

In some embodiments, the selective inspection of one or more packets is facilitated using a programmable switch. In some embodiments, the programmable switch is a Software Defined Network switch. In some embodiments, the programmable switch mirrors selected client-server packets from the selected networked device to enable passive analysis. In some embodiments, the message from a selected network device is sent to the network controller that performs the selective inspection of one or more packets.

In some embodiments, determining whether the accepted authentication response is correlated with a known authentication request may also include determining whether the known authentication request includes a vulnerable authentication credential. In some embodiments, determining whether the known authentication credentials contain vulnerable authentication credentials may also include comparing the metadata against a known list of vulnerable authentication credentials.

In some embodiments, aspects of the invention may also include signaling the network controller that it has accepted an authentication response that includes vulnerable authentication credentials. In some embodiments, aspects of the invention may also include signaling a network device to deauthorize the networked device associated with the accepted authentication response containing vulnerable authentication credentials.

In some embodiments, aspects of the invention may also include replacing an identified vulnerable authentication credential with a credential approved by the network controller. In some embodiments, aspects of the invention may also include storing the analyzed authentication metadata and related analysis results on a networked device. In some embodiments, aspects of the invention may also include providing a visual representation of the extracted metadata analysis.

BRIEF DESCRIPTION OF THE DRAWINGS

FIG. 6A depicts a visual representation of exemplary packet signatures of a basic scheme used to passively assess the risk of vulnerable passwords.

FIG. 6B depicts a visual representation of exemplary packet signatures for a digest scheme used to passively assess the risk of vulnerable passwords.

DETAILED DESCRIPTION

Figure 1:
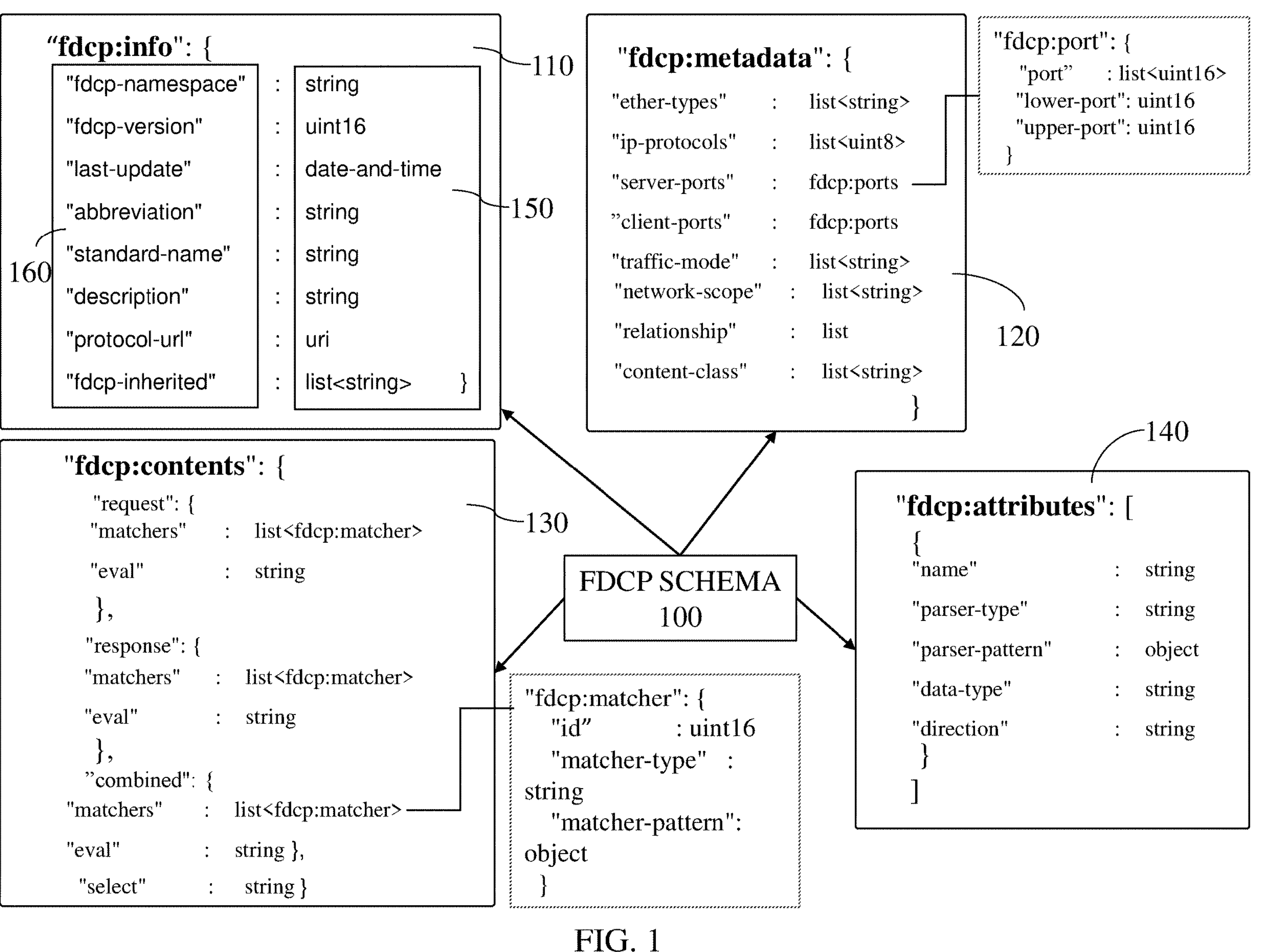
FIG. 1 depicts an exemplary visual representation of data models for our FDCP schema.

The description that follows includes systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Machine-processable descriptions of assets and networks have proven to be effective enablers in automating various network management tasks. Organizations like the IETF and NTIA have attempted to develop standard data formats that help reduce the (network-level and device-level) risks of connecting IoT devices to networks. The IETF standard encourages IoT vendors to publish formal specifications of the intended purpose of their IoT devices in the form of a Manufacturer Usage Description (MUD). Given the MUD profile of a device, its network behavior in any operating environment can be locked down and verified rigorously. A valid MUD profile contains several access control entries (ACE), each matching on endpoints (IP address or domain name), source/destination port numbers for TCP/UDP, and type and code for ICMP.

NTIA defined the format of Software Bill of Materials (SBOM). An SBOM is a formal, machine-readable inventory of software components and dependencies, information about those components, and their hierarchical relationships. Suppose a manufacturer utilizes a web server, for example, sourced from a trusted supply chain, for enterprise-grade cameras. Once a vulnerability is discovered for that specific web server, corresponding SBOM data can help alert network administrators who deployed those cameras to take necessary measures in preventing and/or mitigating cyber incidents.

MUD and SBOM complement each other by targeting network behavioral versus device-embedded security at foundational levels. While effective, MUD and SBOM do not fully cover vulnerabilities that may be introduced into managed networks of IoT devices, namely communication protocols.

It is essential for network operators to obtain visibility into various protocols (e.g., HTTP, NTP, TLS) used by individual network connected devices, how protocols are implemented/configured on those devices, and whether those protocols pose cyber/operational risks to their networks and organization. Traditional network intrusion detection systems and traffic analyzers often rely on transport-layer port numbers to describe protocols (e.g., TCP/80 for HTTP, UDP/123 for NTP), though they may employ "proprietary" signatures for the content of certain protocols. Metadata, like port numbers or Ether type, may help describe the identity of some communication protocols, but there are subject to change and can be used by malicious applications, and are often incomplete (e.g., lack a wealth of characteristics unique to each protocol).

A communication protocol is an established set of rules determining how data within a series of packets is exchanged between network connected devices with different capabilities sourced from various manufacturers. While communication protocols constitute an essential foundation of IoT networks, protocols can be the source of risks (operation and/or security) if not implemented, configured, or used appropriately. Certain protocols (e.g., HTTP, TLS, DNS, FTP, NTP) were developed decades ago without security measures built in and hence become attractive to malicious actors (e.g., Wannacry, Multigrain, NotPetya). Many standard protocols have been (continue to be) revised by standard bodies (e.g., IETF) and information technology organizations (e.g., Microsoft) to combat security and operation challenges. Despite updates, refinements, or even deprecation, various devices and systems (typically in large enterprises) unknowingly continue to use outdated, vulnerable protocols.

Each protocol is often unique, displaying indefinable patterns in traffic headers, contents, or even statistical characteristics (e.g., temporal activity) and operates in a specific way (e.g., containing extractable unique attribute fields) detailed by the organization that developed the protocol. Popular protocols, such as those in the client-server model, like Hypertext Transfer Protocol (HTTP) is an application-layer protocol that allows a client to communicate with a server on a request-response basis. It typically takes place over TCP/80 for exchanging unencrypted contents and TCP/443 for exchanging encrypted contents. HTTP can be used on non-standard port numbers for both benign (e.g., private web servers) and/or malicious (e.g., transferring pirated contents from compromised servers) reasons. Additionally, this protocol provides a variety of authentication schemes.

As is common to evolving protocols, reference guidelines associated with each protocol also change to help mitigate cybersecurity risk. For example, over the past three decades, HTTP has evolved from v0.9 to v3. Earlier versions like HTTP/1.0 are not considered to be secure for communication events. Reference guidelines suggest not using user authentication over HTTP unless used in conjunction with methods like SSL. A reference guideline used in conjunction with a schema may suggest an attribute, such as a user name and a password contained within a packet flow passed over the network in plain text format be flagged as a security risk. Like other protocols, a series of packets using an HTTP protocol have well-defined semantics, including request methods, request header fields, response status codes, and response header fields, along with the payload of messages. Fields in headers provide information that can help with risk assessment. For example, User-Agent (in the request header) identifies the application, operating system, manufacturer, and/or version of the requesting user agent. These distinct attributes, identifiable amongst standard communication protocols, make a schema for describing communication protocols possible. Monitoring a series of packets within a network flow of IoT devices using a Formal Description of Communication Protocols (FDCP) schema makes it possible to extract attribute values from the series of packets to determine whether attribute values are consistent with a reference value guideline for the communication protocol or not.

In some embodiments, common semantics are used to describe characteristics (e.g., a metadata signature, a content signature, data attributes) of various communications protocols that can be used in conjunction with reference network behavioral profiles (e.g., MUD) to create a reference data model for a communication protocol. A reference data model abstraction benefits various network management tasks. For example, a reference data model helps to map individual access control entries (ACE) of a reference behavioral profile to known protocols, assisting device behavioral fingerprinting and device classification. In some embodiments a descriptive model may also detect risks such as weak cipher suit proposed/negotiated in TLS, default credentials used for HTTP authentication (client-server communications), or an obsolete version of NTP.

FIG. 1 illustrates a visual representation of an FDCP schema 100, in a JSON-formatted data model. An FDCP schema 100 formally describes attributes 110, 120, 130, and 140 that can be extracted from a series of packets within a network flow. The attributes 110, 120, 130, and 140 may vary based on the given communication protocol (e.g., an HTTP protocol, a DHCP protocol, a FTP protocol, a TLS protocol, an XMPP protocol, a TFTP protocol, POP3 protocol, IMPAP protocol, an IPP protocol, a LPD protocol, an NTP protocol, RTP protocol, RTMP protocol, a SIP protocol, an SSDP protocol, an SMB protocol, an SNMP protocol, an SMTP protocol, a DNP3 protocol, a DNS protocol, an MDNS protocol, an NBNS protocol, a BACnet protocol, an NTP protocol or the like). Attributes vary based on the communication protocol. Attributes such as a protocol version, an authentication method, credentials, a user agent, and a negotiated cipher that are exchanged over one protocol may not be applicable for another.

In one embodiment, an FDCP schema is a formal description of characteristics of a series of packets belonging to a 5-tuple, the identity of a "protocol flow" consisting of a couple of unidirectional flows. FIG. 1 illustrates a visual representation of an FDCP schema 100, as a JSON-formatted data model. In some embodiments, an FDCP schema 100 contains four key components, namely "fdcp:info" 110, "fdcp:metadata" 120, "fdcp:contents" 130, and "fdcp:atttributes" 140. The number of components within the FDCP data model 100 of a given communication protocol may need to be increased in order to account for as many of the characteristics values 150 that communication protocol may contain within a given series of packets. In some embodiments, an FDCP schema 100 may contain a subset of these four attributes 110, 120, 130, 140, a schema referred to as a partial characterization schema. Even each section may contain partial information about the corresponding protocol.

In some embodiments, the "info" attribute 110 provides high-level information about the reference data model itself. The info attribute 110 contains fields such as a "fdcp: namespace," a unique ID that may contain created. Fields 160 like "abbreviation", "standard-name", and "description" allow creators to provide additional information on the names (if any) and description of the reference communication protocol. In some embodiments, "protocol-url" refers to a public source of information (e.g., an RFC) creators may use to access or call the subject protocol. Lastly, an "fdcp-inherited" field indicates whether characteristics of this communication protocol are inherited from other known protocols (e.g., protocols like IPP1 and CMP2 inherit their content structure from HTTP).

In some embodiments, the "metadata" attribute 120 captures information related to the network flow a communication protocol uses for communication. Four fields are dedicated to describe headers of data-link layer ("ether-types"), network layer ("ip-protocols" e.g., TCP, UDP), transport layer ("serverports" and "client-ports"). It can be seen at the top center of FIG. 1 that ports can be in forms of a list of "port" like TCP/80, TCP/8008, TCP/8080, TCP/8888 for HTTP and/or a range from "lower-port" to "upper-port" like UDP/137-139, UDP/445 for SMB. Traditional network intrusion detection systems use metadata fields (specially transport-layer port numbers) as signatures of protocols [4]. Note that transport layer port numbers (even specified by RFCs) often can change the identify of its creator) along with "fdcp:version" and "last-update" to indicate its version and the time it was.

Figure 2:
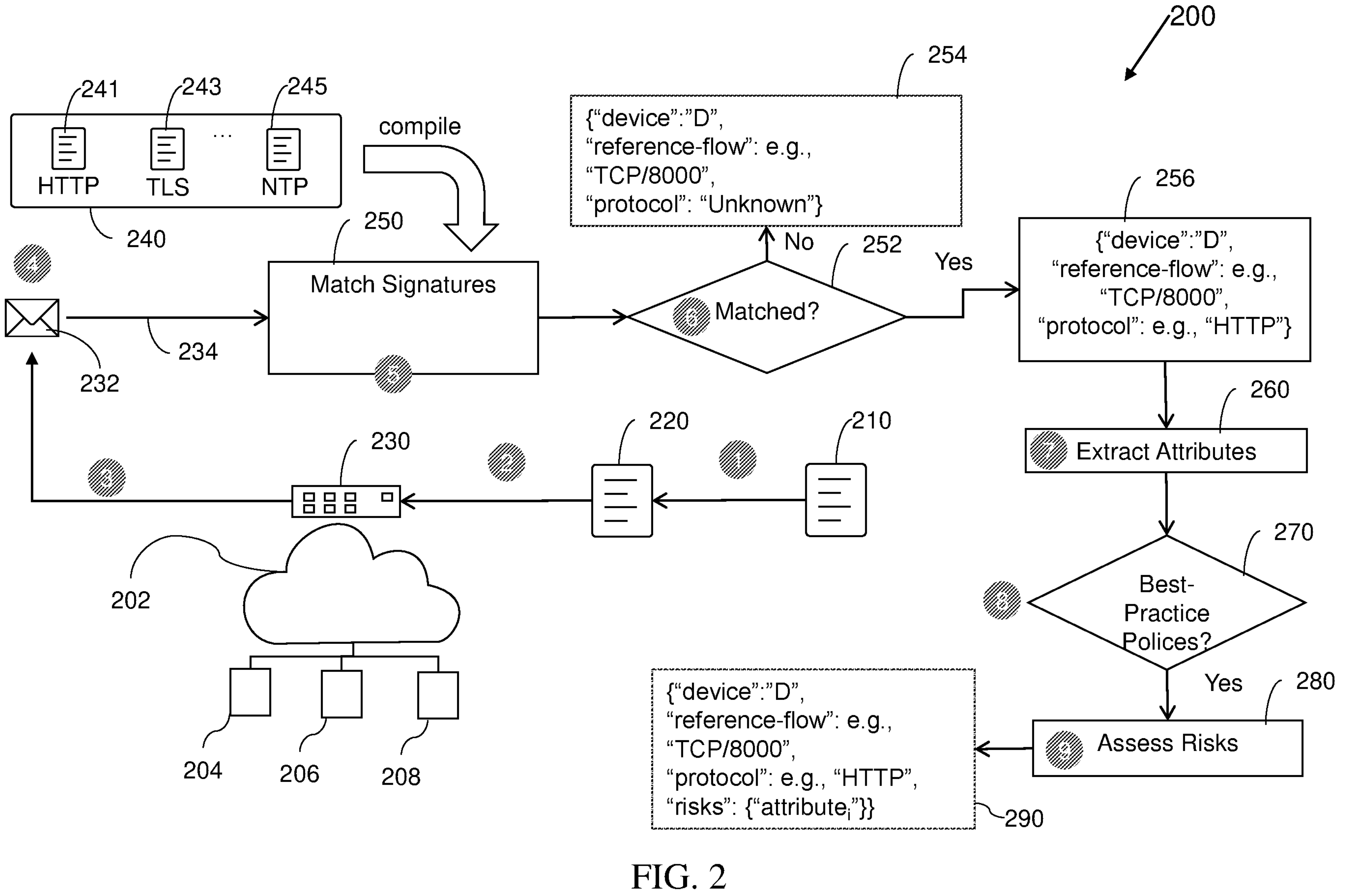
FIG. 2 depicts an application of an FDCP data models, according to some embodiments of the present disclosure.

FIG. 2 illustrates how FDCP principles may be used to address at least two asset management tasks, namely (a) mapping a series of packets of a networked device to a known communication protocol and (b) assessing risks and cybersecurity vulnerabilities in a series of packets by comparing an extracted attribute value from the series of packets to a reference value guideline of a reference data model. In some embodiments, the asset inventory and reference profiles 210 may use MUD profiles of the networked devices. Each reference profile 210 contains intended network flows of an IT device type (e.g., a device make and device model) in the form of access control entries (ACE) 220. ACEs 220 are used to configure (step 2) a selected series of packets of a network flow (step 3).

A variety of techniques may be used to select the series of packets 234, for example using a programmable switch 230 to capture network flows. In some embodiments, selected packets 234 may be arranged in two arrays (step 4), each containing a series of two tuples consisting of a packet and its arrival time. For example, a first array (not shown) may take the form "array1:[($pkt_1$, $t_1$), ($pkt_2$, $t_2$), . . . , ($pkt_j$, $t_j$)]" while a second array (not shown) may take the form "array2:[($pkt_1$, $t_1$), ($pkt_2$, $t_2$), . . . , ($pkt_k$, $t_k$)]".

These arrays of the selected the series of packets 234 are next matched (step 5) to a communication protocol by comparing the signatures of the series of packets 234 with a repository of FDCP reference data models 240. The repository of FDCP reference data models 240 may be populated based on the knowledge-base of communication protocols. For example, a HTTP reference data model 241, a TLS reference data model 242, an NTP reference data model, and other reference data models may be stored in the repository of FDCP reference data models 240 when each respective communication protocol (e.g., HTTP, TLS, and NTP) is detected or when the network is commissioned. Communication protocols often use standard port numbers common to the communication protocol (e.g., DNS over UDP/53, DHCP onUDP/67, NTP on UDP/123), easing the protocol discovery process. There are instances however where communication protocols occur over non-standard port numbers. For example, TLS may be found on TCP/443, TCP/8883, or TCP/56700 from traffic of many network connected devices. Also, HTTP may be found in traffic of two port numbers, namely TCP/80 and TCP/8080. Over a large enough network or over a longer duration of managing network activity, non-standard port number usage may be inventoried to facilitate the matching of network traffic of new IoT devices to their communication protocols.

Once the series of packets are matched to a known protocol 252 (step 6), corresponding attributes 256 are extracted 260 as specified by a corresponding FDCP data model (step 7). Lastly, risk assessment 280 can be performed (step 9) by comparing an extracted attribute value from the series of packets to a reference value guideline from a best-practice policy 270 for the detected protocol 256 (step 8).

Figure 3:
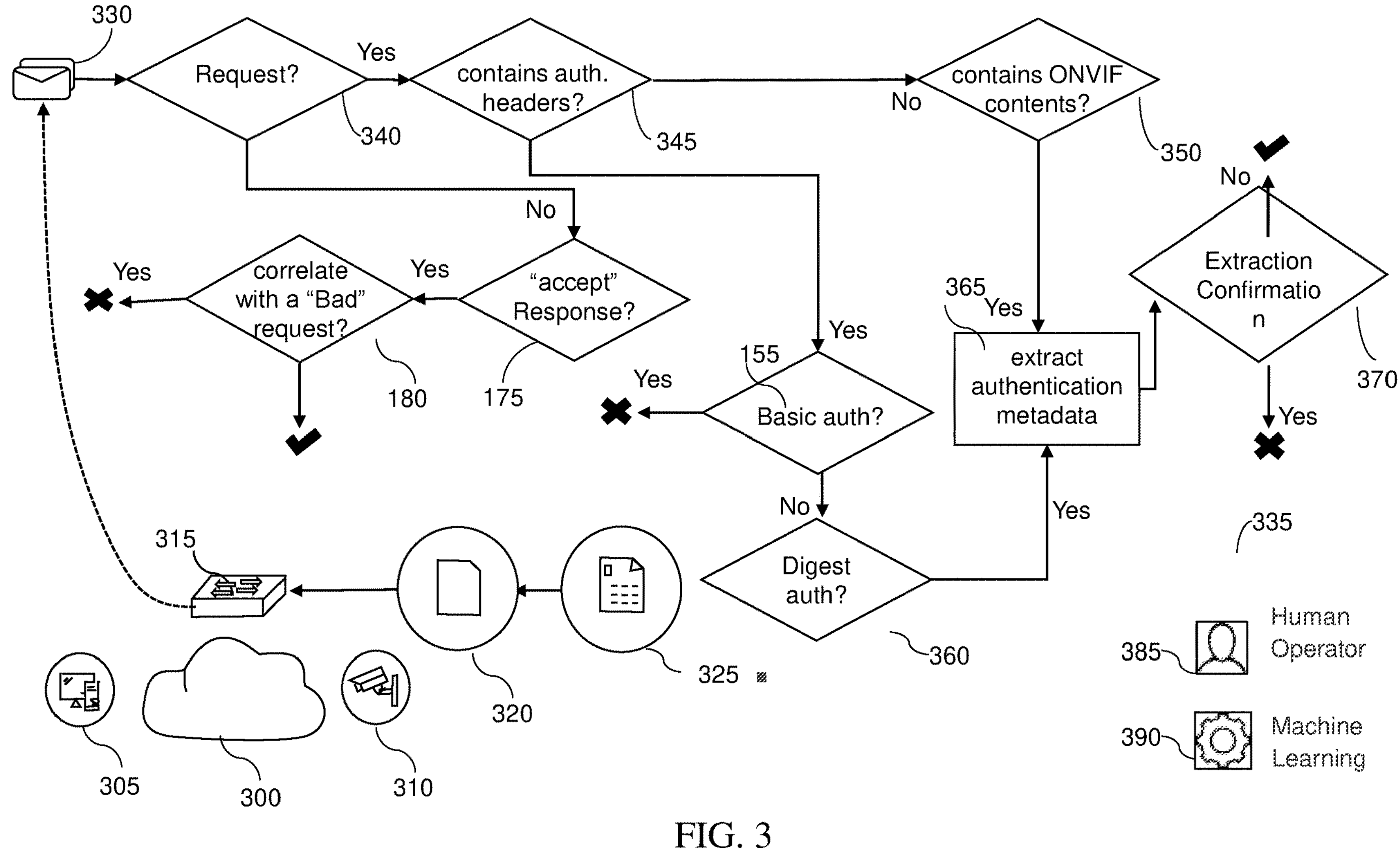
FIG. 3 is a flowchart illustrating a computer-implemented method for assessing the authentication vulnerability status of one or more networked devices, according to some embodiments of the present disclosure.

FIG. 3 further depicts an application 100 of Formal Description of Communication Protocols (FDCP) models in mapping network flows in a network 102 of IoT devices 104, 106, 108 detected by a network switch 130 to an FDCP reference data model 140. The application 100 may include an asset inventory and reference profiles 110 related to the network 102 of IoT devices 104, 106, 108.

Monitoring policies describing the permissible communications from the devices within the asset inventory and reference profiles 110 may be captured in a configuration file 120. Such a configuration file 120 may be used to monitor network traffic and implement network traffic policies on a programmable switch 130. In the system, the programmable switch 130 may receive a flow from one or more selected networked devices 104, 106, 108, the flow 132 containing a series of packets (e.g., an array 1:[($pkt_1$, $t_1$), ($pkt_2$, $t_2$), . . . , ($pkt_j$, $t_j$)] and an array2:[($pkt_1$, $t_1$), ($pkt_2$, $t_2$), . . . , ($pkt_k$, $t_k$)]) associated with a communication protocol (e.g., TCP/8000 of device D).

Aspects of the present disclosure include a passive and systematic risk assessment for assessing the properties, configurations, and vulnerabilities of various communication protocols (e.g., HTTP, NTP, TLS) used by IoT assets that may be formally recorded in machine-processable data structures.

In some embodiments, a data schema, called Formal Description of Communication Protocols (FDCP), describes signatures of the series of packets (packet-/flow-level) with a reference data model (e.g., a communication protocol) used within an Internet of Things (IoT) network. In some embodiments, various attributes of a series of packets within a flow (e.g., a protocol version, an authentication method, a user agent, or an encryption algorithm) can be associated (matched and/or computed) with a communication protocol. In some embodiments, the FDCP schema codifies acceptable values (best practices) within a flow to determine whether attributes values extracted from a series of packets within the flow are consistent with a guideline of the reference protocol.

In one example an inspection of the signature of a series of packets is used to determine that the HTTP communication protocol is in use. Based on the HTTP communication protocol, attribute values associated with an authentication request made from an enterprise-grade camera are detected. In some embodiments, the authentication methods and specific signatures in authentication queries and responses may be identified and highlighted. A cybersecurity risk system using "selective" inspection of network packets enabled by leveraging a formal Manufacturer Usage Description (MUD) behavioral profile of IoT devices, and a risk assessment algorithm, such as a Passively Assessing the Risk of Vulnerable Passwords (PARVP) algorithm, may be used to automatically and passively determine whether password-protected devices, are accessible using vulnerable credentials. Non-limiting examples of networked devices include a network attached camera, printers, Network Attached Storage (NAS) Devices, servers, automated lighting systems, Heating, Venting, Air Conditioning (HVAC) system, safety systems such as a network fire alarm system, and security systems. An attribute value may be compared with a reference value guideline for the HTTP communication protocol. A vulnerable credential of the extracted attribute value may be compared to a reference value guideline such as easily guessed passwords, may use a well-known or manufacturers' default passwords, may use a password associated with another network device, a password found on the dark web, or a password a known network user has utilized on the same or other network device or personal account in the past. Once a risk of the attribute value is determined, in this instance an authentication vulnerability, an alert may be generated for corrective action by the network administrator or device owner.

In one experiment in which a cyber security vulnerability had to be determined, a risk assessment algorithm, or a PARVP algorithm was applied to traffic traces of 1.4 million HTTP authentication sessions from 1,108 live network attached cameras collected from a university campus network over the course of three weeks. In an experiment, the network attached cameras were sent default passwords while controllers were used to determine which devices were accessed by an insecure authentication.

Risk Assessment Algorithm & System

FIG. 3 depicts an exemplary flow diagram of a system used to passively assess the risk of vulnerable passwords. The system uses a decision tree to determine how an HTTP message, which may include an authentication packet, is processed. In one embodiment, a determination may be made whether the packet is a request or response. Given a request packet, the authentication scheme may be extracted along with its corresponding metadata from the HTTP packet header or other content. If the authentication scheme is basic or plaintext WSS, the user credentials can be easily decoded or readily obtained, and thus represents a risky scheme ("x" marks) would be assessed by a risk assessment algorithm.

In the case of a more secure authentication scheme such as digest authentication, the password check may be performed as follows: the authentication metadata of the request packet along with individual passwords in a pre-populated checklist (default and publicly known) may be passed through the hashing process of the authentication scheme. Note that metadata elements like nonce can change dynamically for every authentication session, and therefore checklist digest values need be computed per each request packet and cannot be pre-computed. If none of the checklist passwords yield the same response, then the request is secure ("✓"), otherwise a risky password is identified ("x" marks). Lastly, if a risky request containing an encoded/plaintext password or digest of a default/known password is paired with an accepted authentication response, then the third type of cyber risk is flagged ("x" mark). In some embodiments the risk assessment algorithm may include a database of devices, contextual information of the device (such as whether a compromised device could compromise human safety for example a compromised network attached elevator break), and a hash operation to assess the overall security risk.

In some embodiments, a network controller, such as those used in a SDN network, may limit the assessment to a specific IoT device, a specific environment (such as a server room or a network device outside a changing room in a gym), a direction flow of traffic (to or from a network attached IoT device) or a specific packet type on the network. In one such example, network traffic could be restricted to selected HTTP packets from cameras of a specific manufacturer model detected on the network.

Computer-implemented methods can scale to high throughput (e.g., tens of Gbps) of network traffic since not every packet is inspected. Implementing such criteria helps enable faster processing of network traffic, thereby enabling faster identification of potential vulnerabilities while also minimizing the resource usage and time delays caused by packet inspection. Selective deep packet inspection is facilitated by employing a programmable switch (e.g., OpenFlow-based or P4-based) that sits parallel to the operational network, receiving a copy of the entire network traffic and mirroring the selected packets for passive inference. Monitoring policies for target devices and their selected packets can be defined statically via a configuration file or dynamically via API calls, or by specifying an IP address and/or a MAC address.

According to FIG. 3, a risk assessment algorithm for determining whether an HTTP packet contains a request or response attribute value, whether the packet contains authentication metadata, and assessing the risk of the authentication between a network controller 305 and one or more networked cameras 310 is depicted. The Network 300 is connects a controller 305, camera 310, and a Programmable Switch 315. A configuration file 320 and Behavioral Profiles 325 provide policies allowing the Programmable Switch 315 to monitor for potential network 300 and device 310 vulnerabilities such as authentication vulnerabilities arising from an attribute value in an HTTP Packet 330. Config File 320 is a representative example of a broader set of possible identifiers such as an IP address, a MAC address, and/or a VLAN tag. A risk assessment algorithm, such as the Passively Assessing Risk of Vulnerable Passwords (PARVP) Algorithm 335, is used within the system. In some embodiments, the PARVP Algorithm can include Request Decision 340, Authentication Header Decision 345, Open Network Video Interface Forum (ONVIF) Decision 350, Basic Authentication Decision 355, and Digest Authentication Decision 360. The system also includes Metadata Extraction 365, Extraction Confirmation 370, and when the system determines that the HTTP packet is a response, whether the system incorporating the Programmable Switch 315 and the Network Controller 305 accepts the response in Response Decision 375, and determining whether the response is correlated with a bad request vulnerability with Bad Request Decision 380.

These decisions may be performed within a system configured with hardware, software, and firmware wherein the algorithm is typically executed in a client-server fashion given the nature of the client-server protocol deployed. For example, the algorithm could be deployed on a server in an onsite or remote data center, within a cloud-computing environment, or a hybrid environment where some server components are split between on-premise and remote locations. In the present invention, the location of the server is immaterial to its basic functionality, and the term "server" itself may comprise an amalgamation of hardware and software that can be located within, for example, Programmable Switch 315, the Network Controller 305, or even a sophisticated device that in some embodiments could include Networked Camera 310.

In FIG. 3, HTTP Packet 330 represents a message using a client-server protocol from a selected network device Programmable Switch 315. The Network Controller 305 may be used to selectively inspect network packets 330 and identify one or more packets to investigate for a potential authentication vulnerability 355, 360, and 370. Similarly, Programmable Switch 315 may be used to selectively inspect network packets and identify one or more packets to investigate for a potential authentication vulnerability. Programmable Switch 315 may be a Software Defined Network (SDN) switch. Programmable Switch 315 may mirror selected client server packets from Network 300, Camera 310, or the Network Controller 305 to help enable passive analysis. Passive analysis differs from active analysis in that passive analysis enables the inspection of packets without compromising the system and thus enabling the system to perform as intended without a noticeable impact on performance or increased risk of security. The client-server protocol may be undecrypted. Camera 310 represents the one or more networked security devices that can be selected by a Human Operator 385 as part of the method for assessing the authentication vulnerability status of one or more networked devices. Human Operator 385 may be onsite in the same physical location as the system and networked devices 310, or may be remote. Other networked devices may include a thermostat, an occupancy sensor, an HVAC system, a lighting system, an access controller, a fire alarm, a physical security system, a camera, a networked appliance, an industrial device, or robotic device. This selection may include Machine Learning 390 assistance for making the decisions of what networked devices should be inspected, what packets should be inspected, and even what controller or programmable switch should be chosen as part of the method. Machine Learning 390 may be one or more algorithms that have been trained by a human or other machine to provide assistance in selecting the most appropriate packet for the analysis to determine the risk level of the authentication under consideration. Machine Learning 390 may be a part of a separate system or may be included with the exemplary system described in FIG. 4.

Request Decision 340 determines that the message is an authentication request based upon the received HTTP Packet 330. Authentication Header Decision 345 determines whether there is an authentication header. If one is present, then the flow moves to Basic Authentication Decision 355. If no header is present, Open Network Video Interface Forum (ONVIF) Decision 350 is made that determines whether ONVIF content is continued in the selected packet. Specifically, ONVIF Decision 350 determines whether an identified token-based SOAP authentication method conforms to Open Network Video Interface Forum (ONVIF) specifications. If ONVIF content is contained in the selected packet, then Metadata Extraction 365 occurs. There is a presumption in the exemplary flow that an analyzed request will utilize basic, digest, or ONVIF authentication. The method allows, however, for a broader potential number of authentication methods such as but not limited to New Technology LAN Manager (NTLM) and token-based SOAP authentication.

Basic Authentication Decision 355 determines whether basic authentication is used. If it is used, then the authentication credentials can be confirmed to be at risk. If it is not used, then Digest Authentication Decision 360 determines whether digest authentication is used. If it is used, then Metadata Extraction 365 occurs.

Metadata Extraction 365 extracts the authentication metadata from the message based at least in part upon the determined authentication method wherein the authentication metadata includes at least one authentication credential. Extraction can occur from the header or payload of HTTP Packet 330 and may employ the use of signature matching. The extracted metadata contains at least one of a hashed password, nonce, authentication credentials, authentication scheme, message response code, SOAP XML file, or the request's timestamp. Extraction Confirmation 370 confirms this step has occurred. Response Decision 375, and determining whether the response is correlated with a bad request vulnerability with Bad Request Decision 380 are used to determine a vulnerability of the authentication credential of the networked device based at least in part upon the extracted authentication metadata. This determination may include comparing the extracted metadata against a known authentication response.

Figure 4:
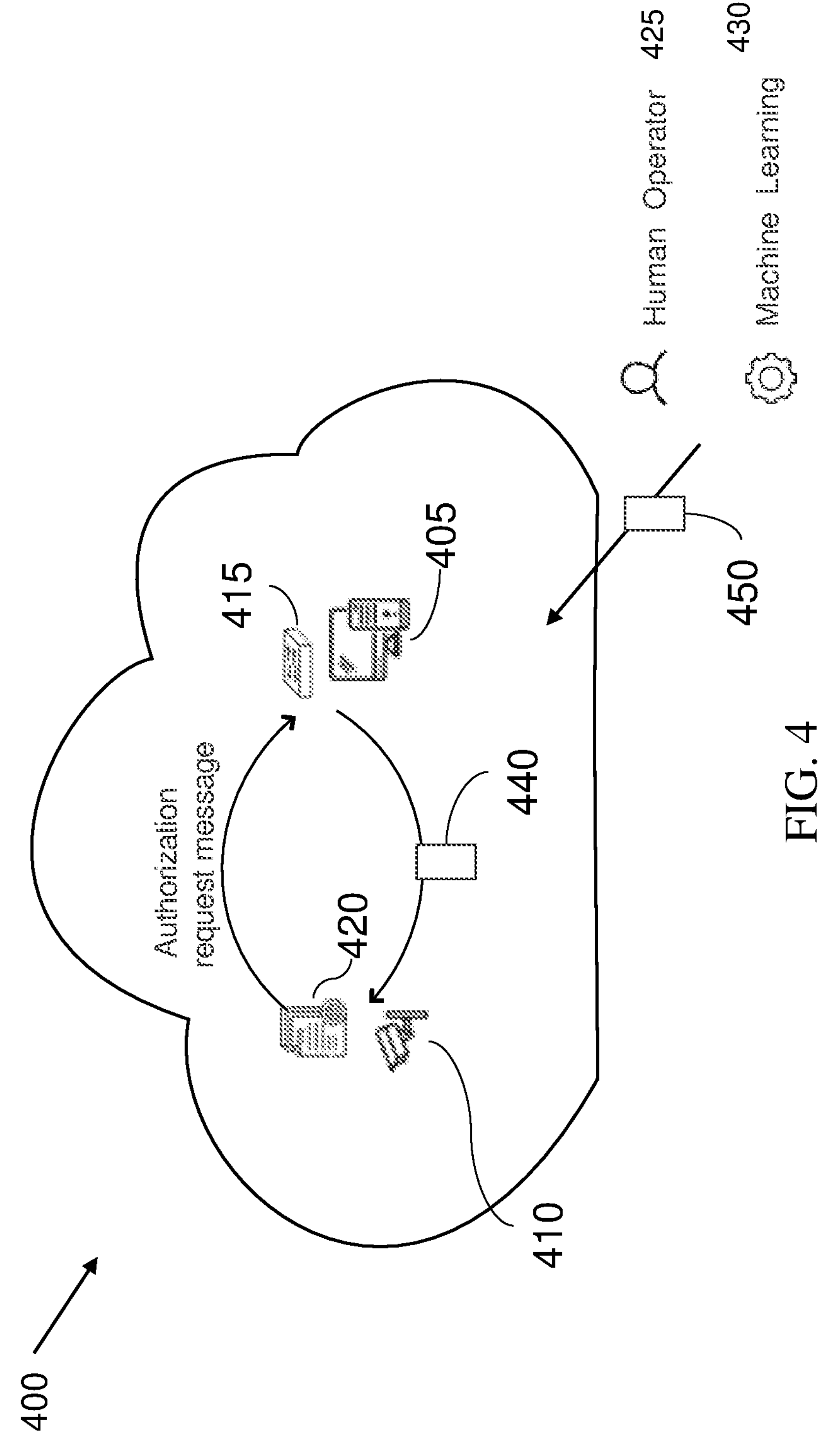
FIG. 4 depicts an exemplary implementation of a network or cloud-based system to passively assess the risk of vulnerable passwords using an exemplary Passively Assessing the Risk of Vulnerable Passwords (PARVP) technique.

FIG. 4 depicts an exemplary implementation of a system used to passively assess the risk of vulnerable passwords named PARVP system. The PARVP system discloses the network 400 having a network controller 405, network device (e.g., camera 410), a programmable switch 415, and a config file 420. Further, the system discloses that the network device, (e.g., camera 410) is augmented by the use of machine learning 430 in support of a human operator 425 such as a network system administrator. The Machine Learning 430 may be one or more algorithms to assist in selecting the most appropriate packet for the analysis to determine the risk level of the authentication under consideration. Such a feature may be helpful in prioritizing vulnerabilities within a large network. The human operator 425 may be onsite in the same physical location as the system and networked devices or may be remote. Further, the network 400 discloses an authentication response message that may be transmitted by the network controller 405 to the network device (e.g., camera 410). The authentication response message may include a response message 440 that then leads to acceptance and correlation from the network controller. Further, the network 400 discloses an authentication request message may be transmitted by the config file 420 to the programmable switch 415. The authentication request message may include a request message 450 having an authentication method, authentication metadata, vulnerability, header, and payload.

Authentication in Cameras & Passive Risk Assessment

Figure 5:
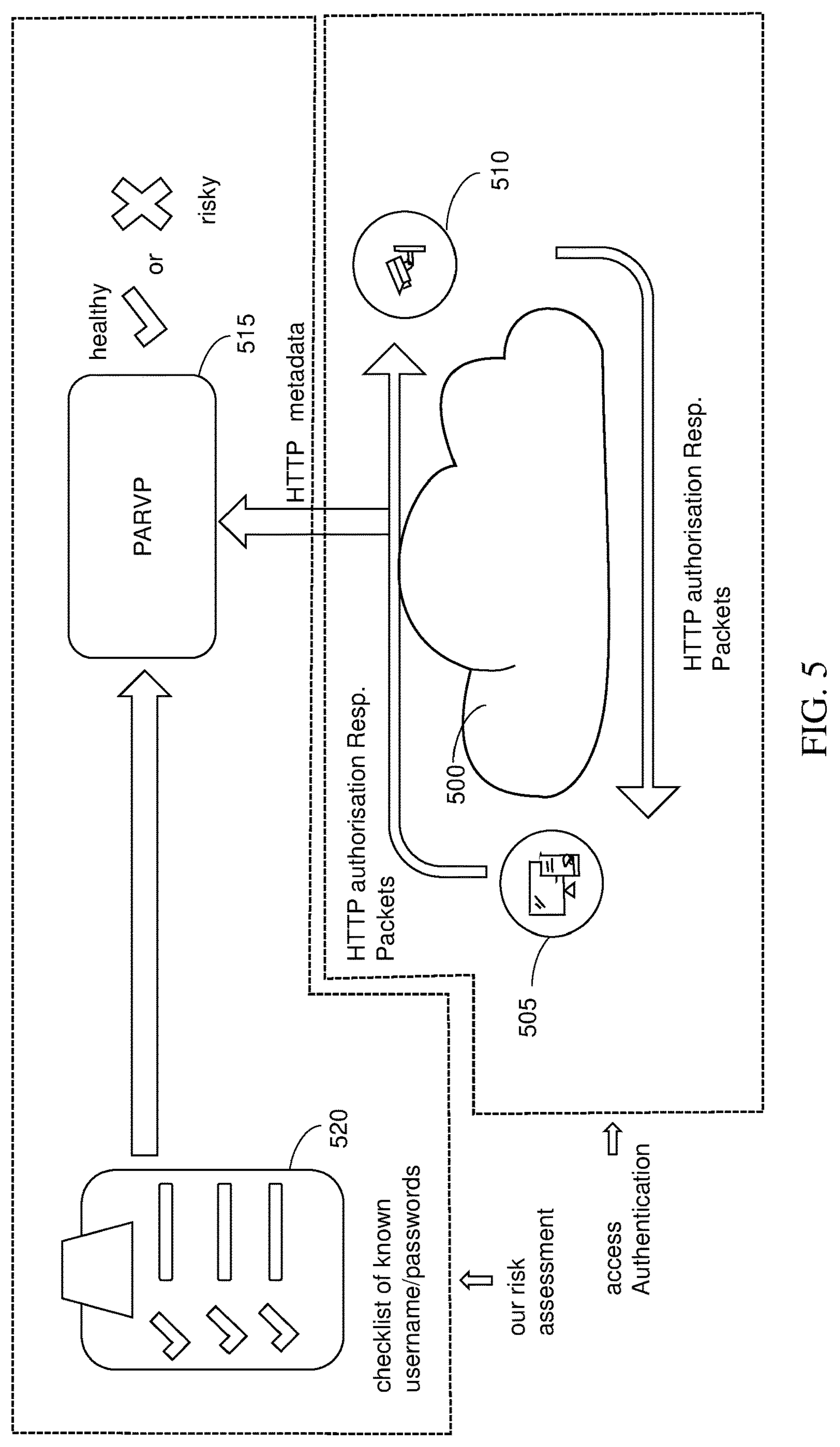
FIG. 5 depicts an exemplary environment of the PARVP system architecture.

FIG. 5 depicts an exemplary environment of the system architecture. A brief discussion on ways of remote access and authentication offered by enterprise grade networked cameras is depicted. Further, a computer-implemented method for assessing the risk of access authentication in these networked cameras is also depicted.

Commercial networked cameras 510 often allow their legitimate users to access video footage (live and/or recorded). To grant access, each camera of networked cameras 510 often acts as an HTTP server, authenticating requests from clients. Best security practices contained within a reference guideline, however, may suggest that web servers should operate over HTTPS and not HTTP. It should be noted that employing HTTPS for cameras 510 deployed at scale in enterprise networks 500 can be particularly challenging. This is primarily because, in HTTPS best practices, a camera must present a SSL/TLS certificate to connecting clients, verifying the networked camera's 530 identity and thus preventing hackers from intercepting any exchanged data. Best practices within the policy guidelines may stipulate an attribute value like certificates need to match a reference value guideline such as a signature of a trusted authority or to be self-signed by the corresponding camera. Extracting attribute values, such as individual certificates from trusted authorities is deemed expensive or at least challenging by network operators due to additional engineering and operational efforts (e.g., creating a publicly registered hostname) required for thousands of installed cameras 510. Self-signed certificates are also undesirable, as they require operators to store certificates and make each certificate "trusted" on every controller (client) 505 that may access these cameras 510.

To overcome these challenges, some manufacturers have introduced the concept of cloud-managed networked cameras 510. A cloud-based software centralizes the control of a network of cameras 510, allowing operators to interact with their cameras 510 more seamlessly and securely, manage user permissions, perform security checks, and more. This added security introduces its own technical and economic challenges, including: (a) specific configuration required per each camera 510, (b) provisioning additional Internet bandwidth, (c) securing the communication between cameras 510 and the cloud server, and (c) paying subscription fees (vendor lock-in).

Therefore, most enterprises typically tend to rely on simpler methods like segmentation (e.g., an "air-gapped" network where there is no physical connection such as an Ethernet cable between a camera and the rest of the physical network) to manage the cybersecurity risk of their operational devices and keep their cameras 510 isolated on certain VLANs.

Attribute: HTTP Authentication

There exist several standard schemes of HTTP authentication available for manufacturers to implement for their networked cameras 310, each differing in their operation and security. Certain schemes such as OAuth are used to facilitate third-party access delegation across web applications without sharing the passwords, while others like HOBA require a digital signature (combination of public and private keys) for each client without needing a password database on the server. Before accessing the camera 510, the client (remote controller) 505 needs to determine the authentication scheme supported by the HTTP server running on the camera 510.

In commercial IoT devices such as networked cameras, the HTTP communication protocol may provide two authentication schemas: basic and digest methods. While both basic and digest methods can authenticate users, the digest method provides greater security and is therefore a recommended best practice for unencrypted channels, such as when TLS is not available. In the basic authentication method, a request contains a header field in the form of "Authorization: Basic <credentials>", where credentials are the Base64 encoded version of username and password joined by a single colon. The Base64 encoding is easily reversible and thereby insecure over HTTP. Digest authentication (RFC2617), on the other hand, applies several steps to compute a hashed response value can be used for authentication and may be preferred to minimize a risk to the network.

Digest authentication has undergone many revisions since its inception. Developers are provided with various options of advanced hashing algorithms like SHA-256 to enhance the collision resistance. Also, the classic steps can be adjusted to embed more arguments for computing the hashed response. These requirements are relayed by setting a field called qop in the WWW-Authenticate header sent by the server during initial steps of HTTP authentication.

Web Service Security (WSS) is an extension to the SOAP messaging protocol (typically encapsulated in HTTP packets) to apply security features like certificates and/or credentials to Web services. UsernameToken is a key security feature in WSS, responsible for carrying credentials like username and password in XML format. It supports both plaintext and digests passwords. Developers may choose to use SOAP-based communication over HTTP, as SOAP offers a rich set of libraries and extensions for transferring diverse data. In the context of networked cameras, controls on tilt and zoom can be embedded within an XML tag, rather than using a combination of HTTP headers, forms, and payloads. This flexible approach led manufacturers to agree on a standard, called ONVIF, to leverage SOAP-based communication for data exchange across multi-vendor platforms.

In order to correctly extract authentication metadata, signatures may be developed in a lab by offline processing of packet captures. In the exemplary study, a set of signatures includes three widely-used authentication schemes: HTTP Basic, HTTP Digest, and WSS UsernameToken plaintext/Digest (used by ONVIF-compatible devices) and could be readily extended to accommodate other authentication schemes in the future. FIG. 4A-4C provides a visual representation (i.e., Wireshark view) of packet signatures for each of these three schemes.

FIG. 6A depicts a visual representation of packet signatures for a basic scheme. In one embodiment, the visual presentation may be depicted in the Wireshark view. In FIG. 4A, the signature for HTTP basic may be defined by the use of an authorization header. The authorization header describes the scheme in use and provides all corresponding metadata required to authenticate the client.

FIG. 6B depicts a visual representation of packet signatures for a digest scheme. In one embodiment, the visual presentation may be depicted in the Wireshark view. In FIG. 4B, the signature for digest schemes may be defined by the use of an authorization header. The authorization header describes the scheme in use and provides all corresponding metadata required to authenticate the client.

Figure 6C:
FIG. 6C depicts a visual representation of an exemplary WSS digest authentication used to passively assess the risk of vulnerable passwords.

FIG. 6C depicts a visual representation of WSS digest authentication. In one embodiment, the visual presentation may be depicted in the Wireshark view. In FIG. 4C, the WSS Username Token may use an XML structure to encapsulate all authentication metadata inside the "UsernameToken" tag of the HTTP content.

Figure 7:
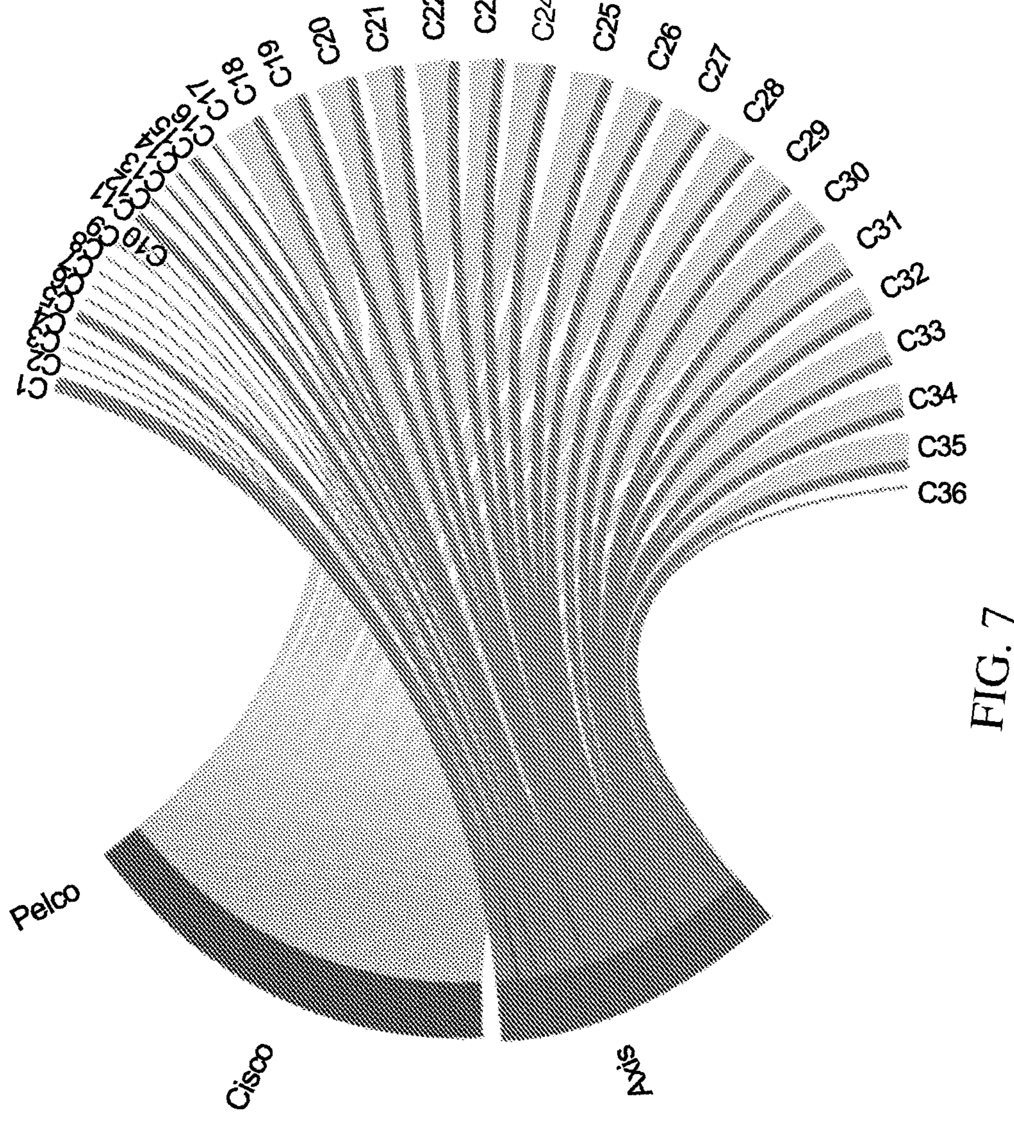
FIG. 7 depicts a exemplary visual representation of vulnerable controllers identified by the exemplary PARVP technique.
Figure 8:
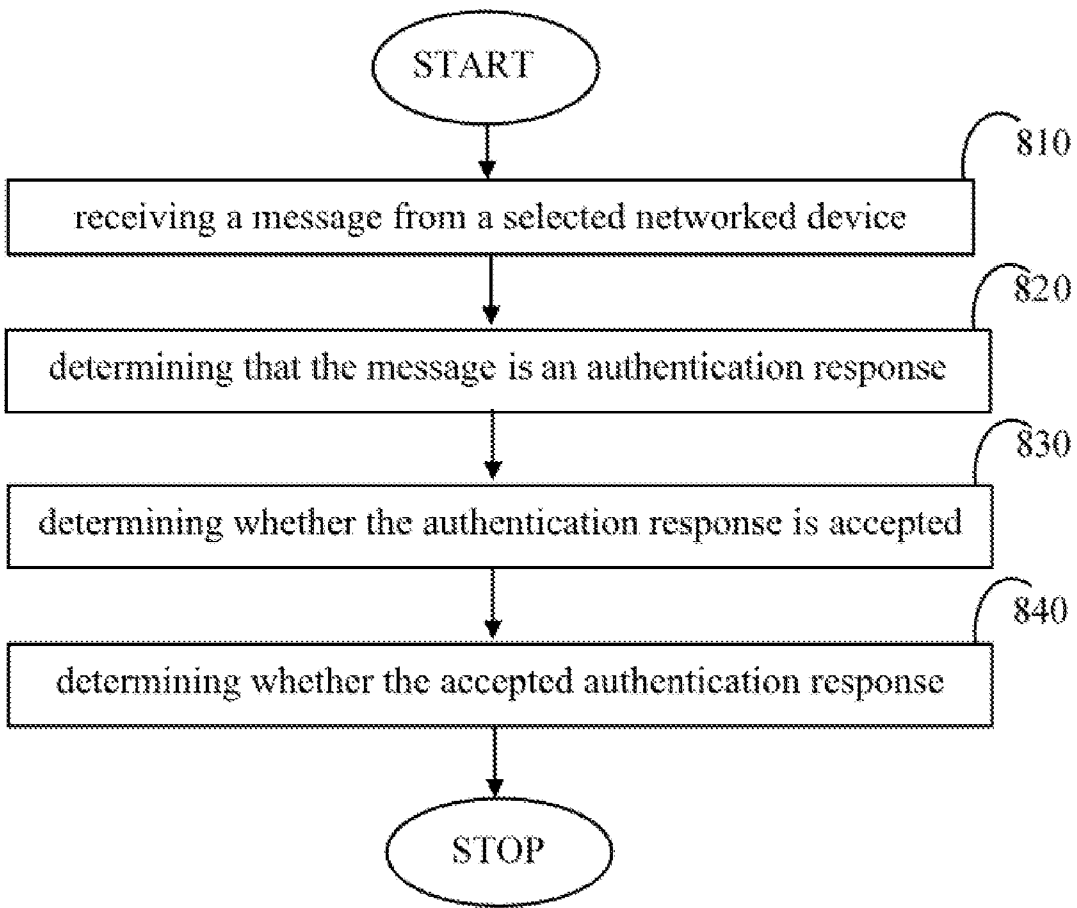
FIG. 8 depicts an exemplary computer-implemented method for identifying an authentication request in a network message, extracting the authentication metadata from the authentication request, and determining the vulnerability of the authentication credential.

FIG. 7 depicts a visual representation of vulnerable controllers in the exemplary experiment. Some potential risks associated with controllers in accessing or attempting to access the cameras may be focused on. The controllers may be categorized into three groups, including (i) C1-C17, which are consistently rejected by cameras, (ii) C18-C35, which are accepted sometimes and rejected some other times, and (iii) C36, which is always successful in HTTP authentication.

The C1-C17 controllers only contact Axis cameras and solely offer the obsolete password via basic and/or digest authentication. In order to mitigate the operational and cyber risks that these controllers present to this camera network, they probably need to be decommissioned or at least reconfigured/upgraded. The C18-C35 controllers tend communicate with all three types of cameras (Axis, Cisco, and Pelco) and display some operational failures (rejected authentication requests). Two controllers (C28, C29) were found transmitting ONVIF-formatted requests to Axis cameras. However, Axis cameras on this network are not yet ONVIF-enabled, hence respond with a 400 Bad Request status code. Another two controllers (C23, C24) were found sending incomplete HTTP digest authentication metadata (FIG. 6B) expected by Axis cameras. In their request packets, they missed to embed cnonce, nc, algorithm and response into their requests, hence resulted in HTTP responses with status code 400. Also, C18-C35 were found communicating with Cisco cameras (ONVIF-enabled), infrequently receive an HTTP response with status code 400 and a payload containing "max pull point exceeded" error. Note that each ONVIF request for certain tasks, like tilting the camera lens or accessing the camera feed, creates a pull point resource on the camera which has a limited capacity available to handle concurrent connections. Finally, 15 of the C18-C35 controllers occasionally received "500 Internal Server Error" responses from their target cameras. Overall, the C15-C35 controllers display behaviors indicating some operational risk but not significant cyber risks. Lastly, the C36 controller seems to operate with all of its authentication requests successfully responded to by six Axis cameras. However, this controller and its target cameras are not necessarily secured since the authentication requests contain a default password (though it is hashed). Therefore, the configuration of this controller and the six networked cameras needs to change to comply with best practices for the HTTP reference data model to mitigate a significant cyber risk.

Further, identifying the application used by individual controllers for accessing the cameras may be investigated. 30 controllers may be found that provided User-Agent in the header of their HTTP requests made to the cameras, while the other six did not reveal their agent. Three agents including gSOAP (from 10 controllers), omnicast (from 19 controllers), and Chrome (from a controller) are identified. The agents like gSOAP and the omnicast are typically used in management applications of IP (Internet Protocol) cameras. Interestingly, the controller C36 accesses the Axis cameras from the Chrome web browser, not from the vendor-supplied management software.

Figure 9:
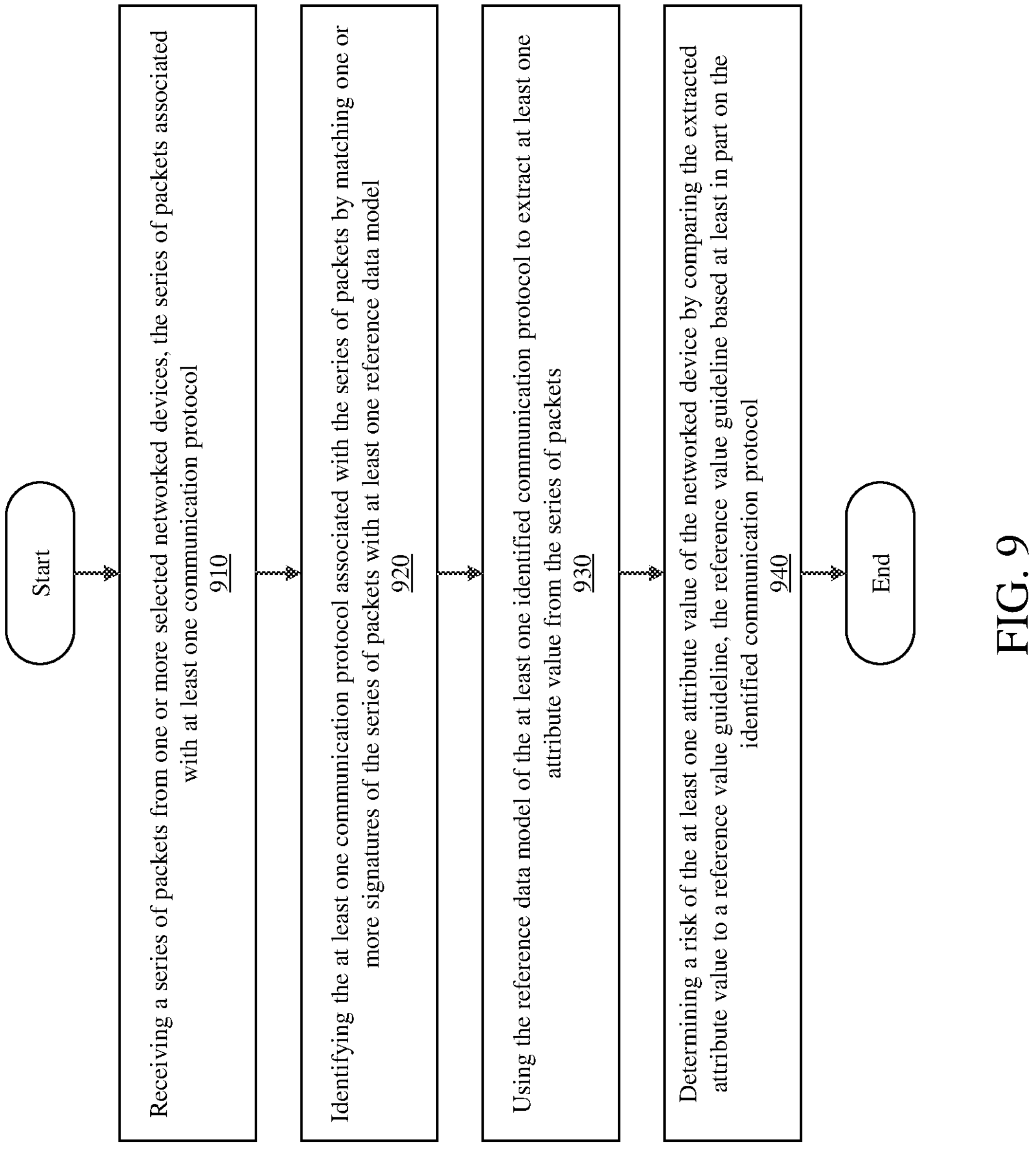
FIG. 9 is a flowchart illustrating a computer-implemented method for assessing the risk status of one or more networked devices, according to some embodiments of the present disclosure.

FIG. 9 is a flowchart that describes a computer-implemented method for assessing the risk status of one or more networked devices, according to some embodiments of the present disclosure. In some embodiments, at 910, the computer-implemented method may include receiving a series of packets from one or more selected networked devices, the series of packets associated with at least one communication protocol. At 920, the computer-implemented method may include identifying the at least one communication protocol associated with the series of packets by matching one or more signatures of the series of packets with at least one reference data model.

In some embodiments, at 930, the computer-implemented method may include using the reference data model of the at least one identified communication protocol to extract at least one attribute value from the series of packets. At 940, the computer-implemented method may include determining a risk of the at least one attribute value of the networked device by comparing the extracted attribute value to a reference value guideline, the reference value guideline based at least in part on the identified communication protocol.

In some embodiments, the one or more networked devices may be one of a security camera, a thermostat, an occupancy sensor, an HVAC system, a lighting system, an access controller, a fire alarm, a physical security system, a camera, a networked appliance, an industrial device, or a robotic device. In some embodiments, the computer-implemented method may include receiving a network device selection command. The network device selection command may be received by at least one of an API call and a security configuration.

In some embodiments, receiving a network device selection command may be selected from a list of one or more networked devices. In some embodiments, the selection of the networked devices may be based on at least one of a configuration file, an IP address, a MAC address, and a VLAN tag. In some embodiments, the at least one reference data model may be a JSON-formatted data model. In some embodiments, the at least one communication protocol may be an application layer protocol, a Secure Socket Layer protocol, a network layer protocol, and a datalink layer.

In some embodiments, the at least one communication protocol may be an HTTP protocol, a DHCP protocol, a FTP protocol, a TLS protocol, an XMPP protocol, a TFTP protocol, POP3 protocol, IMAP protocol, an IPP protocol, a LPD protocol, an NTP protocol, RTP protocol, RTMP protocol, a SIP protocol, an SSDP protocol, an SMB protocol, an SNMP protocol, an SMTP protocol, a DNP3 protocol, a DNS protocol, an MDNS protocol, an NBNS protocol, a BACnet protocol, and an NTP protocol.

In some embodiments, the at least one communication protocol may be a client-server protocol, a TCP/IP protocol, a UDP protocol, an automation protocol, a Bluetooth protocol, a file transfer protocol, an instant messaging protocol, and an internet protocol, an OSI protocol, a routing protocol, a web service protocol, a Web 3.0 protocol, and a blockchain protocol. In some embodiments, the computer-implemented method may include implementing a selective inspection of one or more packets from within the series of packets may be facilitated using a network switch.

In some embodiments, the network switch may be a programmable switch. In some embodiments, the programmable switch may comprise instructions that when implemented cause the programmable switch to mirror a selection of packets from the series of packets for passive analysis. In some embodiments, the series of packets from the selected networked device may be sent to a protocol analyzer that performs selective inspection of one or more packets.

In some embodiments, the reference data model further comprises at least one of an attribute value, an info value, a metadata value, and a content value associated with the at least one communication protocol. In some embodiments, an attribute value may be at least one of a name, a parser type, a parser pattern, a data type, and a direction. In some embodiments, a meta data value may be at least one of an ether type, an IP protocol, a server port, a client port, a traffic mode, a network scope, a relationship, and a content class.

In some embodiments, an info value may be at least one of a namespace, version, latest update date, abbreviation, name, description, protocol, protocol URL, and an inheritance. In some embodiments, the protocol URL may specify a web address containing a communication protocol schema. In some embodiments, a content value may be at least one of a matcher, an eval, a matcher type, a matcher pattern, and a select.

In some embodiments, the at least one attribute value may be at least one of a protocol version, an authentication method, a credential, a user agent, and a negotiated cipher. In some embodiments, the extraction of authentication credentials further comprises using signature matching. In some embodiments, extracting the authentication value further comprises extracting authentication credentials from the series of packets.

In some embodiments, using the at least one identified communication protocol to extract at least one attribute value from the series of packets further comprises associating a cybersecurity value with the at least one attribute value. In some embodiments, associating a cybersecurity value with the at least one attribute value further comprises comparing the extracted attribute value with the reference value guideline, the reference value guideline further comprising an expected value from at least one of basic authentication, digest authentication, New Technology LAN Manager (NTLM), and token-based SOAP authentication.

In some embodiments, the token-based SOAP authentication may conform to Open Network Video Interface Forum (ONVIF) specifications. In some embodiments, the extraction of authentication credentials further comprises using signature matching. In some embodiments, the at least one attribute value from the series of packets may further comprise authentication metadata. The risk of the at least one attribute value of the networked device may be an authentication vulnerability.

In some embodiments, the authentication metadata may contain at least one of a hashed password, nonce, authentication credentials, authentication scheme, message response code, SOAP XML file, or the request's timestamp. In some embodiments, the computer-implemented method may include comparing the authentication metadata against a known list of vulnerable authentication credentials contained within the reference guideline.

In some embodiments, the computer-implemented method may include comparing the authentication metadata against a known authentication response. In some embodiments, the computer-implemented method may include storing the authentication metadata on a networked device. In some embodiments, the computer-implemented method may include signalling a network device to deauthorize the networked device associated with an accepted authentication response. The authentication response may contain vulnerable authentication credentials based on the risk. The computer-implemented method further comprises identifying a vulnerable authentication credential based at least in part on the attribute value from the reference data model. In some embodiments, the computer-implemented method may include providing a visual representation of the extracted metadata analysis.

Figure 10:
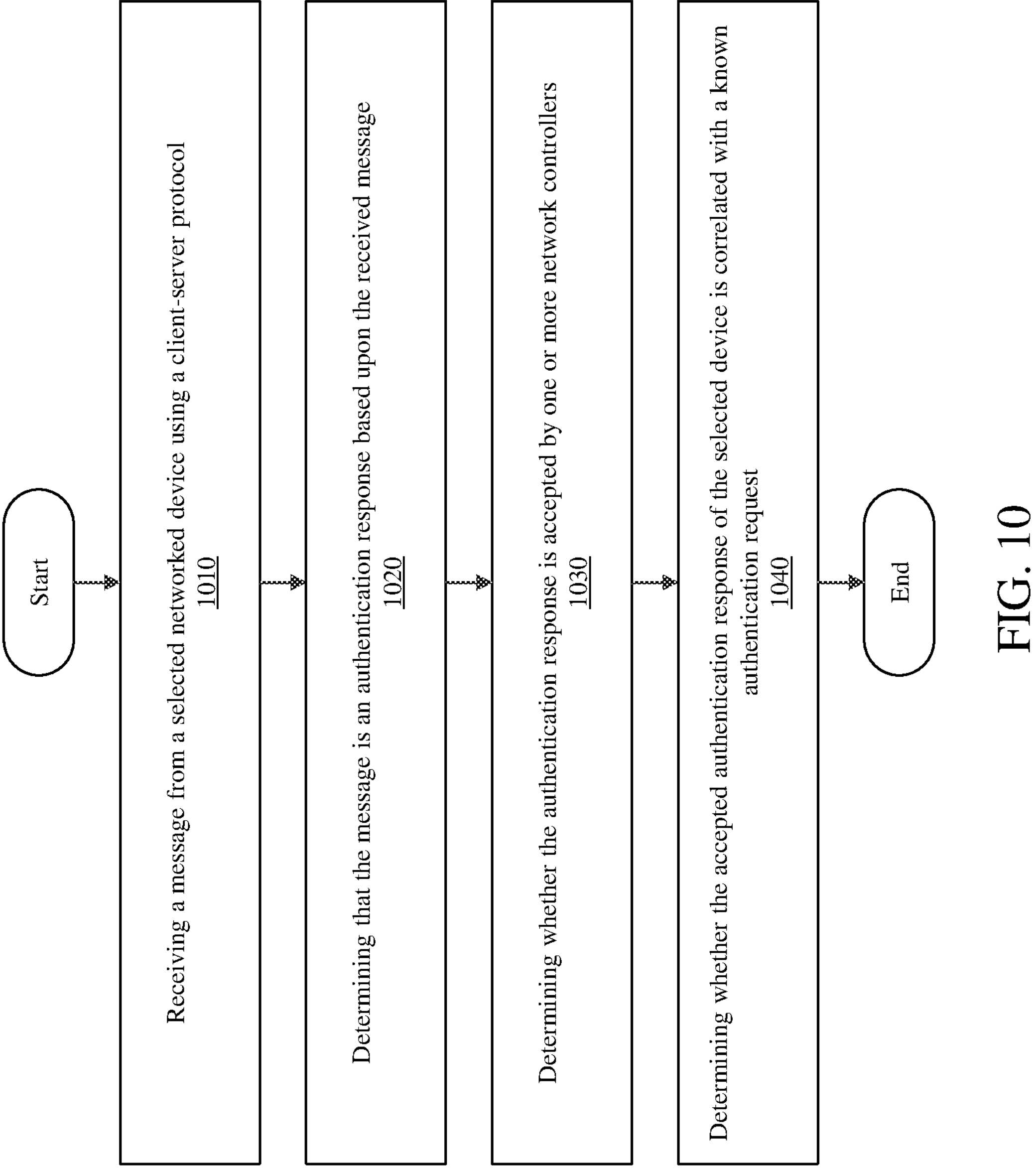
FIG. 10 is a flowchart illustrating a computer-implemented method for assessing the authentication vulnerability status of one or more networked devices, according to some embodiments of the present disclosure.

FIG. 10 is a flowchart that describes a computer-implemented method for assessing the authentication vulnerability status of one or more networked devices, according to some embodiments of the present disclosure. In some embodiments, at 1010, the computer-implemented method may include receiving a message from a selected networked device using a client-server protocol. At 1020, the computer-implemented method may include determining that the message may be an authentication response based upon the received message. At 1030, the computer-implemented method may include determining whether the authentication response may be accepted by one or more network controllers. At 1040, the computer-implemented method may include determining whether the accepted authentication response of the selected device may be correlated with a known authentication request.

In some embodiments, a selective inspection of one or more packets may be used on the received message to determine in part or entirety one or more of the following, the computer-implemented method may include performing one or more additional steps. That the message may be an authentication response, the acceptance of the authentication response by one or more network controllers, and whether the accepted authentication response of the selected device may be correlated with a known authentication request.

In some embodiments, the programmable switch may be a Software Defined Network switch. In some embodiments, the message from a selected network device may be sent to a network controller that performs selective inspection of one or more packets. In some embodiments, determining whether the accepted authentication response may be correlated with a known authentication request further comprises determining whether the known authentication request may include a vulnerable authentication credential. In some embodiments, determining whether the known authentication credentials may contain vulnerable authentication credentials further comprises comparing the authentication metadata against a known list of vulnerable authentication credentials.

Figure 11:
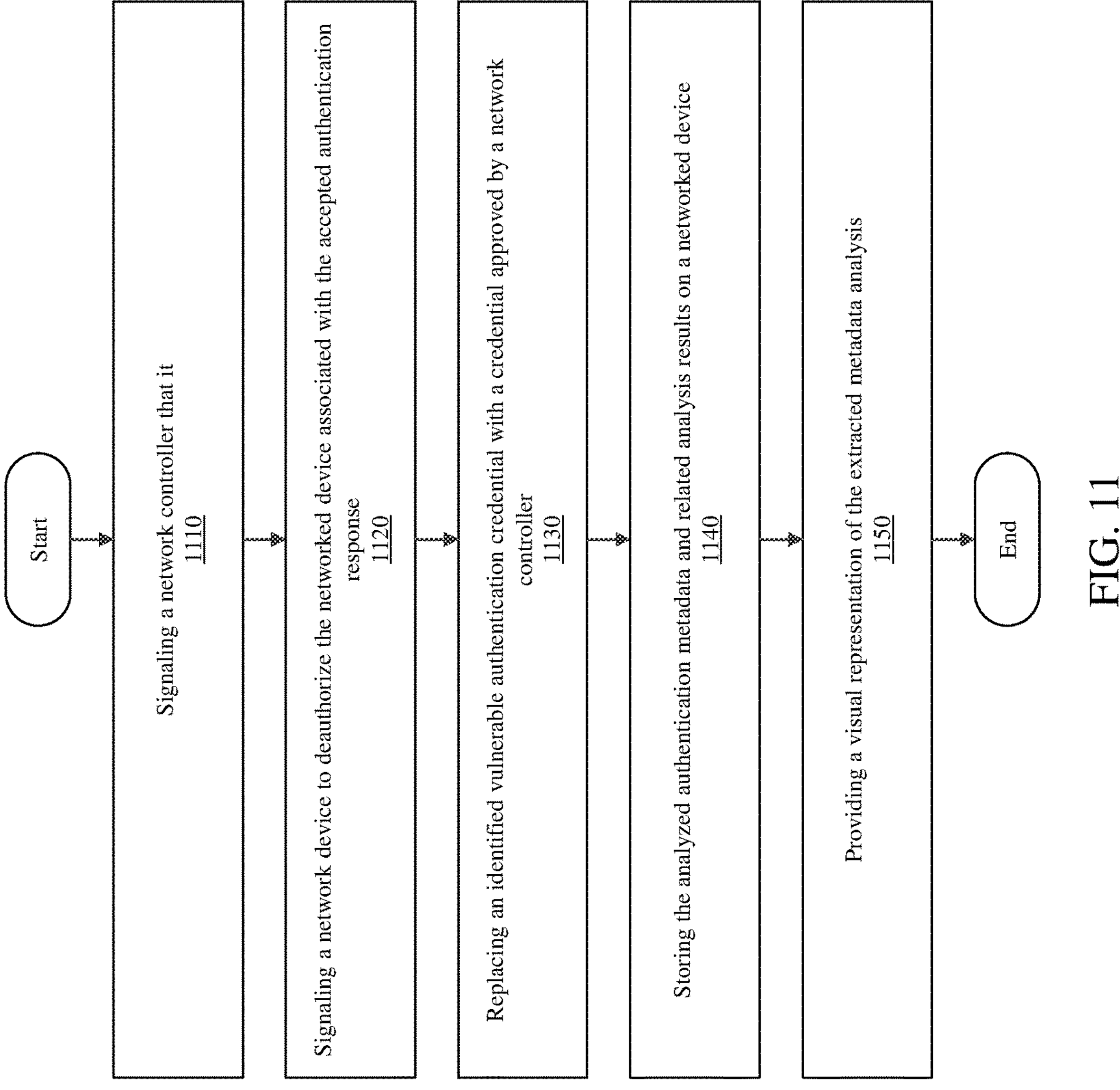
FIG. 11 is a flowchart further illustrating the computer-implemented method for assessing the authentication vulnerability status of one or more networked devices from FIG. 10, according to some embodiments of the present disclosure.

FIG. 11 is a flowchart that further describes the computer-implemented method for assessing the authentication vulnerability status of one or more networked devices from FIG. 10, according to some embodiments of the present disclosure. In some embodiments, at 1110, the computer-implemented method may include signaling a network controller that it accepted an authentication response that included vulnerable authentication credentials. In some embodiments, at 1120, the computer-implemented method may include signaling a network device to deauthorize the networked device associated with the accepted authentication response. Vulnerable authentication credentials.

In some embodiments, at 1130, the computer-implemented method may include altering an identified vulnerable authentication credential with a credential approved by a network controller. In some embodiments, at 1140, the computer-implemented method may include storing the analyzed authentication metadata and related analysis results on a networked device. In some embodiments, at 1150, the computer-implemented method may include providing a visual representation of the extracted metadata analysis.

Figure 12:
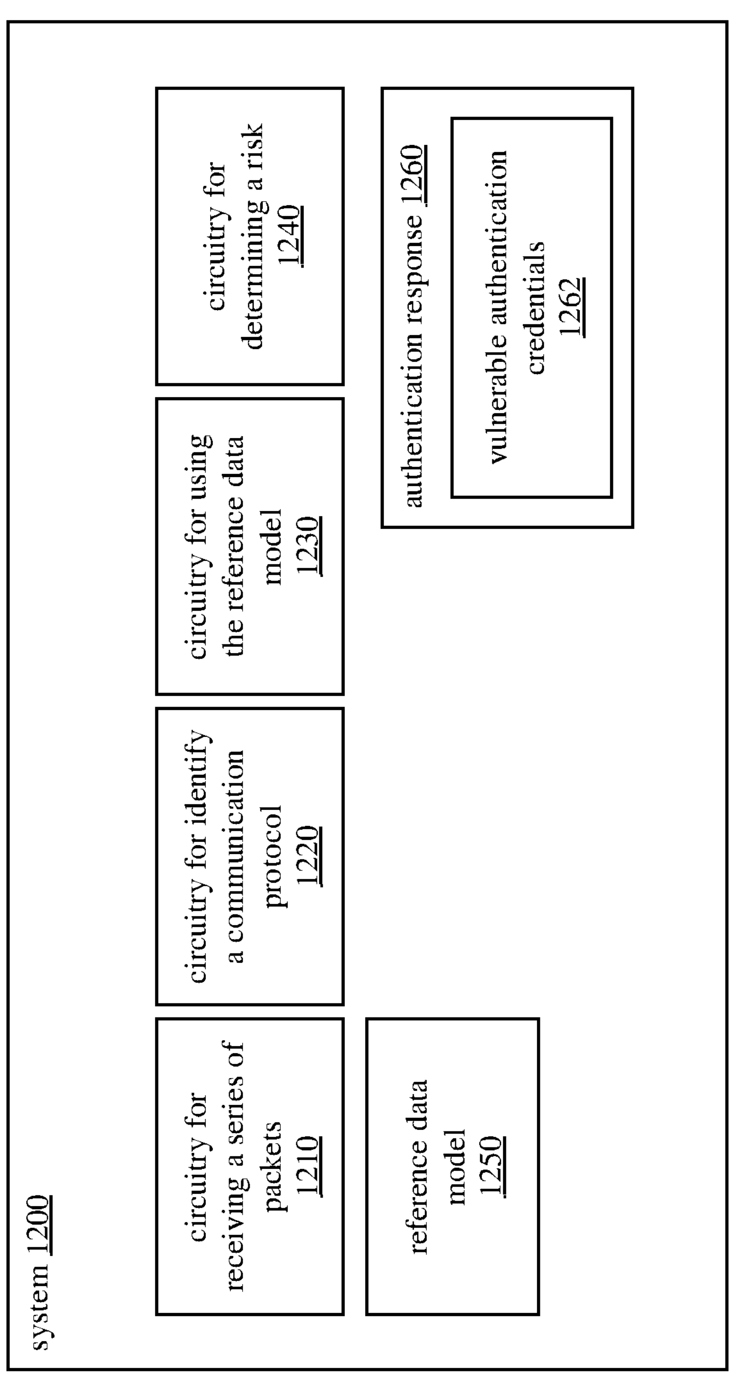
FIG. 12 is a block diagram illustrating a system, according to some embodiments of the present disclosure.

FIG. 12 is a block diagram that describes a system 1200, according to some embodiments of the present disclosure. In some embodiments, the system 1200 may be implemented on a network connected server, a programmable networking switch, or router in combination with a processor. The system may include memory that includes instructions for causing the system processor to implement a series of steps for using a FDCP schema to determine a risk of a series of packets received by the system. The system may also include circuitry 1210 for receiving a series of packets from one or more selected networked devices. The circuitry for receiving the series of packets may include a network server, a router, and a programmable switch such as a software defined network switch. The aforementioned devices may include instructions for associating a series of packets with a communication protocol. Alternatively, the network server, the router, and the programmable switch may be paired with a processor for receiving the series of packets from a network flow.

The system may also include circuitry 1220 for identifying the at least one communication protocol associated with the series of packets by matching one or more signatures of the series of packets with at least one reference data model. In some embodiments, a network server, a router, and a programmable switch such as a software defined network switch may contain instructions, or may be in communication with a processor to match the signatures of the series of packets with a reference data model, the reference data model based at least in part on the identified communication protocol.

In some embodiments, the system 1200 may also include circuitry 1230 for using the reference data model of the at least one identified communication protocol to extract at least one attribute value from the series of packets.

The system 1200 may also include circuitry 1240 for determining a risk of the at least one attribute value of the networked device by comparing the extracted attribute value to a reference value guideline, the reference value guideline based at least in part on the identified communication protocol.

In some embodiments, the one or more networked devices may be one of a security camera, a thermostat, an occupancy sensor, an HVAC system, a lighting system, an access controller, a fire alarm, a physical security system, a camera, a networked appliance, an industrial device, or a robotic device. In some embodiments, receiving a network device selection command. The network device selection command may be received by at least one of an API call and a security configuration.

In some embodiments, receiving a network device selection command may be selected from a list of one or more networked devices. In some embodiments, the selection of the networked devices may be based on at least one of a configuration file, an IP address, a MAC address, and a VLAN tag. In some embodiments, the at least one reference data model may be a JSON-formatted data model. In some embodiments, the at least one communication protocol may be an application layer protocol, a Secure Socket Layer protocol, a network layer protocol, and a datalink layer.

In some embodiments, the at least one communication protocol may be an HTTP protocol, a DHCP protocol, a FTP protocol, a TLS protocol, an XMPP protocol, a TFTP protocol, POP3 protocol, IMAP protocol, an IPP protocol, a LPD protocol, an NTP protocol, RTP protocol, RTMP protocol, a SIP protocol, an SSDP protocol, an SMB protocol, an SNMP protocol, an SMTP protocol, a DNP3 protocol, a DNS protocol, an MDNS protocol, an NBNS protocol, a BACnet protocol, and an NTP protocol.

In some embodiments, the at least one communication protocol may be a client-server protocol, a TCP/IP protocol, a UDP protocol, an automation protocol, a Bluetooth protocol, a file transfer protocol, an instant messaging protocol, and an internet protocol, an OSI protocol, a routing protocol, a web service protocol, a Web 3.0 protocol, and a blockchain protocol. In some embodiments, implementing a selective inspection of one or more packets from within the series of packets may be facilitated using a network switch.

In some embodiments, the network switch may be a programmable switch. In some embodiments, the programmable switch may include instructions that when implemented cause the programmable switch to mirror a selection of packets from the series of packets for passive analysis. In some embodiments, the series of packets from the selected networked device may be sent to a protocol analyzer that performs selective inspection of one or more packets.

In some embodiments, an attribute value may be at least one of a name, a parser type, a parser pattern, a data type, and a direction. In some embodiments, a meta data value may be at least one of an ether type, an IP protocol, a server port, a client port, a traffic mode, a network scope, a relationship, and a content class. In some embodiments, a content value may be at least one of a matcher, an eval, a matcher type, a matcher pattern, and a select.

In some embodiments, the at least one attribute value may be at least one of a protocol version, an authentication method, a credential, a user agent, and a negotiated cipher. In some embodiments, the extraction of authentication credentials. Using signature matching. In some embodiments, extracting the authentication value. Extracting authentication credentials from the series of packets. In some embodiments, using the at least one identified communication protocol to extract at least one attribute value from the series of packets. Associating a cybersecurity value with the at least one attribute value.

In some embodiments, associating a cybersecurity value with the at least one attribute value. Comparing the extracted attribute value with the reference value guideline. The reference value guideline may also include an expected value from at least one of basic authentication, digest authentication, New Technology LAN Manager (NTLM), and token-based SOAP authentication. In some embodiments, the token-based SOAP authentication may conform to Open Network Video Interface Forum (ONVIF) specifications.

In some embodiments, at least one of a hashed password, nonce, authentication credentials, authentication scheme, message response code, SOAP XML file, or the request's timestamp. In some embodiments, comparing the authentication metadata 1420 against a known list of vulnerable authentication credentials contained within the reference guideline. In some embodiments, comparing the authentication metadata 1420 against a known authentication response. In some embodiments, storing the authentication metadata 1420 on a networked device. In some embodiments, identifying a vulnerable authentication credential based at least in part on the attribute value from the reference data model. In some embodiments, the computer-implemented method. Providing a visual representation of the extracted metadata analysis.

In some embodiments, the system 1200 may include a reference data model 1250. The reference data model 1250 may include an attribute value, an info value, a metadata value, and a content value associated with the at least one communication protocol. In some embodiments, an info value may be at least one of a namespace, version, latest update date, abbreviation, name, description, protocol, protocol URL, and an inheritance. In some embodiments, the protocol URL may specify a web address.

In some embodiments, the at least one attribute value from the series of packets. The risk of the at least one attribute value of the networked device may be an authentication vulnerability. In some embodiments, signalling a network device to deauthorize the networked device associated with an accepted authentication response 1260. The authentication response 1260 may include vulnerable authentication credentials 1262 based on the risk.

Those having ordinary skill in the art will recognize that the state of the art has progressed to the point where there is little distinction left between hardware, software, and/or firmware implementations of aspects of systems; the use of hardware, software, and/or firmware is generally a design choice representing cost vs. efficiency tradeoffs (but not always, in that in certain contexts the choice between hardware and software can become significant). Those having ordinary skill in the art will appreciate that there are various vehicles by which processes and/or systems and/or other technologies described herein can be effected (e.g., hardware, software, and/or firmware) and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary.

In some implementations described herein, logic and similar implementations may include software or other control structures suitable to operation. Electronic circuitry, for example, may manifest one or more paths of electrical current constructed and arranged to implement various logic functions as described herein. In some implementations, one or more media are configured to bear a device-detectable implementation if such media hold or transmit a special-purpose device instruction set operable to perform as described herein. In some variants, for example, this may manifest as an update or other modification of existing software or firmware, or of gate arrays or other programmable hardware, such as by performing a reception of or a transmission of one or more instructions in relation to one or more operations described herein. Alternatively, or additionally, in some variants, an implementation may include special-purpose hardware, software, firmware components, and/or general-purpose components executing or otherwise controlling special-purpose components. Specifications or other implementations may be transmitted by one or more instances of tangible or transitory transmission media as described herein, optionally by packet transmission or otherwise by passing through distributed media at various times.

Alternatively or additionally, implementations may include executing a special-purpose instruction sequence or otherwise operating circuitry for enabling, triggering, coordinating, requesting, or otherwise causing one or more occurrences of any functional operations described above. In some variants, operational or other logical descriptions herein may be expressed directly as source code and compiled or otherwise expressed as an executable instruction sequence. In some contexts, for example, C++ or other code sequences can be compiled directly or otherwise implemented in high-level descriptor languages (e.g., a logic-synthesizable language, a hardware description language, a hardware design simulation, and/or other such similar modes of expression). Alternatively or additionally, some or all of the logical expression may be manifested as a Verilog-type hardware description or other circuitry model before physical implementation in hardware, especially for basic operations or timing-critical applications. Those skilled in the art will recognize how to obtain, configure, and optimize suitable transmission or computational elements, material supplies, actuators, or other common structures in light of these teachings.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those having ordinary skill in the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a USB drive, a solid state memory device, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, and a wireless communication link).

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read-only, etc.)), and/or electrical circuitry forming a communications device (e.g., a modem, communications switch, optical-electrical equipment, etc.). Those having ordinary skill in the art will recognize that the subject matter described herein may be implemented in an analog or digital fashion or some combination thereof.

Those skilled in the art will recognize that at least a portion of the devices and/or processes described herein can be integrated into a data processing system. Those having ordinary skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

In certain cases, use of a system or computer-implemented method as disclosed and claimed herein may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory).

A sale of a system or computer-implemented method may likewise occur in a territory even if components of the system or computer-implemented method are located and/or used outside the territory.

Further, implementation of at least part of a system for performing a computer-implemented method in one territory does not preclude use of the system in another territory.

All of the above U.S. patents, U.S. patent application publications, U.S. patent applications, foreign patents, foreign patent applications and non-patent publications referred to in this specification and/or listed in any Application Data Sheet, are incorporated herein by reference, to the extent not inconsistent herewith.

One skilled in the art will recognize that the herein described components (e.g., operations), devices, objects, and the discussion accompanying them are used as examples for the sake of conceptual clarity and that various configuration modifications are contemplated. Consequently, as used herein, the specific examples set forth and the accompanying discussion are intended to be representative of their more general classes. In general, use of any specific example is intended to be representative of its class, and the non-inclusion of specific components (e.g., operations), devices, and objects should not be taken to be limiting.

With respect to the use of substantially any plural and/or singular terms herein, those having ordinary skill in the art can translate from the plural to the singular or from the singular to the plural as is appropriate to the context or application. The various singular/plural permutations are not expressly set forth herein for sake of clarity.

The herein described subject matter sometimes illustrates different components contained within, or connected with, different other components. It is to be understood that such depicted architectures are presented merely as examples, and that in fact many other architectures may be implemented which achieve the same functionality. In a conceptual sense, any arrangement of components to achieve the same functionality is effectively "associated" such that the desired functionality is achieved. Therefore, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of "operably couplable" include but are not limited to physically mateable or physically interacting components, wirelessly interactable components, wirelessly interacting components, logically interacting components, or logically interactable components.

In some instances, one or more components may be referred to herein as "configured to," "configurable to," "operable/operative to," "adapted/adaptable," "able to," "conformable/conformed to," etc. Those skilled in the art will recognize that "configured to" can generally encompass active-state components, inactive-state components, or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such a recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having ordinary skill in the art would understand the convention (e.g., "a system having at least one of A, B, and C" would include but not be limited to systems that have A alone, B alone, C alone, A and B together, A and C together, B and C together, and/or A, B, and C together, etc.). In those instances, where a convention analogous to "at least one of A, B, or C, etc." is used, in general such a construction is intended in the sense one having ordinary skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented as sequences of operations, it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A computer-implemented method for assessing the risk status of one or more networked devices, comprising:

receiving a series of packets from one or more selected networked devices, the series of packets associated with at least one communication protocol;

identifying a communication protocol associated with the series of packets, the identified communication protocol being associated with a reference data model, the reference data model comprising a plurality of attributes of the identified communication protocol;

extracting at least one attribute value of the identified communication protocol from the received series of packets using the reference data model of the identified communication protocol; and determining a risk of a configuration of the identified communication protocol as implemented by the networked device by comparing the extracted at least one attribute value to a reference value guideline for the identified communication protocol, the reference value guideline based at least in part on the identified communication protocol.

2. The computer-implemented method of claim 1, wherein the one or more networked devices is one of a security camera, a thermostat, an occupancy sensor, an HVAC system, a lighting system, an access controller, a fire alarm, a physical security system, a camera, a networked appliance, an industrial device, or a robotic device.

3. The computer-implemented method of claim 1, wherein the reference data model is a JSON-formatted data model.

4. The computer-implemented method of claim 3, wherein the reference data model further comprises at least one of an attribute value, an info value, a metadata value, and a content value associated with the communication protocol.

5. The computer-implemented method of claim 4, wherein an attribute value is at least one of a name, a parser type, a parser pattern, a data type, and a direction.

6. The computer-implemented method of claim 4, wherein a meta data value is at least one of an ether type, an IP protocol, a server port, a client port, a traffic mode, a network scope, a relationship, and a content class; and wherein an info value is at least one of a namespace, version, latest update date, abbreviation, name, description, protocol, protocol URL, and an inheritance.

7. The computer-implemented method of claim 4, wherein a content value is at least one of a matcher, an eval, a matcher type, a matcher pattern, and a select; and the at least one attribute value is at least one of a protocol version, an authentication method, a credential, a user agent, and a negotiated cipher.

8. The computer-implemented method of claim 1, wherein the at least one communication protocol comprises an application layer protocol, a Secure Socket Layer protocol, a network layer protocol, and a datalink layer.

9. The computer-implemented method of claim 1, further comprising implementing a selective inspection of one or more packets from within the series of packets is facilitated using a network switch.

10. The computer-implemented method of claim 1, wherein each packet from the series of packets comprises application layer header data and application layer payload data, wherein the at least one attribute value of the identified communication protocol is extracted from at least one of the application layer header data and application layer payload data; and wherein determining the risk comprises comparing the extracted attribute value to an expected value included in the reference value guideline.

11. A system for assessing the risk status of one or more networked devices, the system comprising:

circuitry for receiving a series of packets from one or more selected networked devices, the series of packets associated with at least one communication protocol;

circuitry for identifying a communication protocol associated with the series of packets, the identified communication protocol being associated with a reference data model, the reference data model comprising a plurality of attributes of the identified communication protocol;

circuitry for extracting at least one attribute value of the identified communication protocol from the received series of packets using the reference data model of the identified communication protocol; and circuitry for determining a risk of a configuration of the identified communication protocol as implemented by the networked device by comparing the at least one extracted attribute value to a reference value guideline for the identified layer communication protocol, the reference value guideline based at least in part on the identified communication protocol.

12. The system of claim 11, wherein the one or more networked devices is one of a security camera, a thermostat, an occupancy sensor, an HVAC system, a lighting system, an access controller, a fire alarm, a physical security system, a camera, a networked appliance, an industrial device, or a robotic device.

13. The system of claim 11, wherein the reference data model is a JSON-formatted data model.

14. The system of claim 13, wherein the reference data model further comprises at least one of an attribute value, an info value, a metadata value, and a content value associated with the at least one communication protocol.

15. The system of claim 14, wherein an attribute value is at least one of a name, a parser type, a parser pattern, a data type, and a direction.

16. The system of claim 14, wherein a meta data value is at least one of an ether type, an IP protocol, a server port, a client port, a traffic mode, a network scope, a relationship, and a content class; and wherein an info value is at least one of a namespace, version, latest update date, abbreviation, name, description, protocol, protocol URL, and an inheritance.

17. The system of claim 14, wherein a content value is at least one of a matcher, an eval, a matcher type, a matcher pattern, and a select; and wherein the at least one attribute value is at least one of a protocol version, an authentication method, a credential, a user agent, and a negotiated cipher.

18. The system of claim 11, wherein the at least one communication protocol comprises an application layer protocol, a Secure Socket Layer protocol, a network layer protocol, and a datalink layer.

19. The system of claim 11, further comprising implementing a selective inspection of one or more packets from within the series of packets using a network switch.

20. The system of claim 11, wherein each packet from the series of packets comprises application layer header data and application layer payload data, wherein the at least one attribute value of the identified communication protocol is extracted from at least one of the application layer header data and application layer payload data; and wherein determining the risk comprises comparing the extracted attribute value to an expected value included in the reference value guideline.

* * * * *